(12) United States Patent
Tatebayashi

(10) Patent No.: US 6,359,986 B1
(45) Date of Patent: Mar. 19, 2002

(54) ENCRYPTION SYSTEM CAPABLE OF SPECIFYING A TYPE OF AN ENCRYTION DEVICE THAT PRODUCED A DISTRIBUTION MEDIUM

(75) Inventor: Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/129,307

(22) Filed: Aug. 5, 1998

(51) Int. Cl.[7] ............................................... H04L 9/00
(52) U.S. Cl. ...................................................... 380/277
(58) Field of Search ................................ 380/259, 277, 380/279, 241, 239, 210; 705/58, 51

(56) References Cited

U.S. PATENT DOCUMENTS 5,592,552 A * 1/1997 Fiat ............................. 380/21

FOREIGN PATENT DOCUMENTS

JP    10224343    8/1998

OTHER PUBLICATIONS

Fiat et al, "Broadcast Encryption", CRYPTO '93, Springer, 1993.*
Berkovits, "How to Broadcast a Secret", Eurocrypt '91, Springer, 1991.*
Chor et al, "Traitor Tracing", CRYPTO '94, Springer, 1994.*

* cited by examiner

*Primary Examiner*—Gail Hayes
*Assistant Examiner*—Matthew Smithers
(74) *Attorney, Agent, or Firm*—Price and Gess

(57) ABSTRACT

A decryption selection control unit controls a ciphertext read unit, a decryption key set read unit, and a decryption selection unit to respectively repeat an encrypted scramble key reading, a decryption key set reading, and an encrypted scramble key decryption until N encrypted scramble keys are read from a distribution medium. As a result, N decryption keys that correctly decrypt the respective N encrypted scramble keys are selected. A key pattern detection unit detects an encryption key set, from M encryption key sets stored in an encryption key table, that matches the selected N decryption keys. A type of an encryption device that produced the distribution medium is specified using this encryption key set.

48 Claims, 18 Drawing Sheets

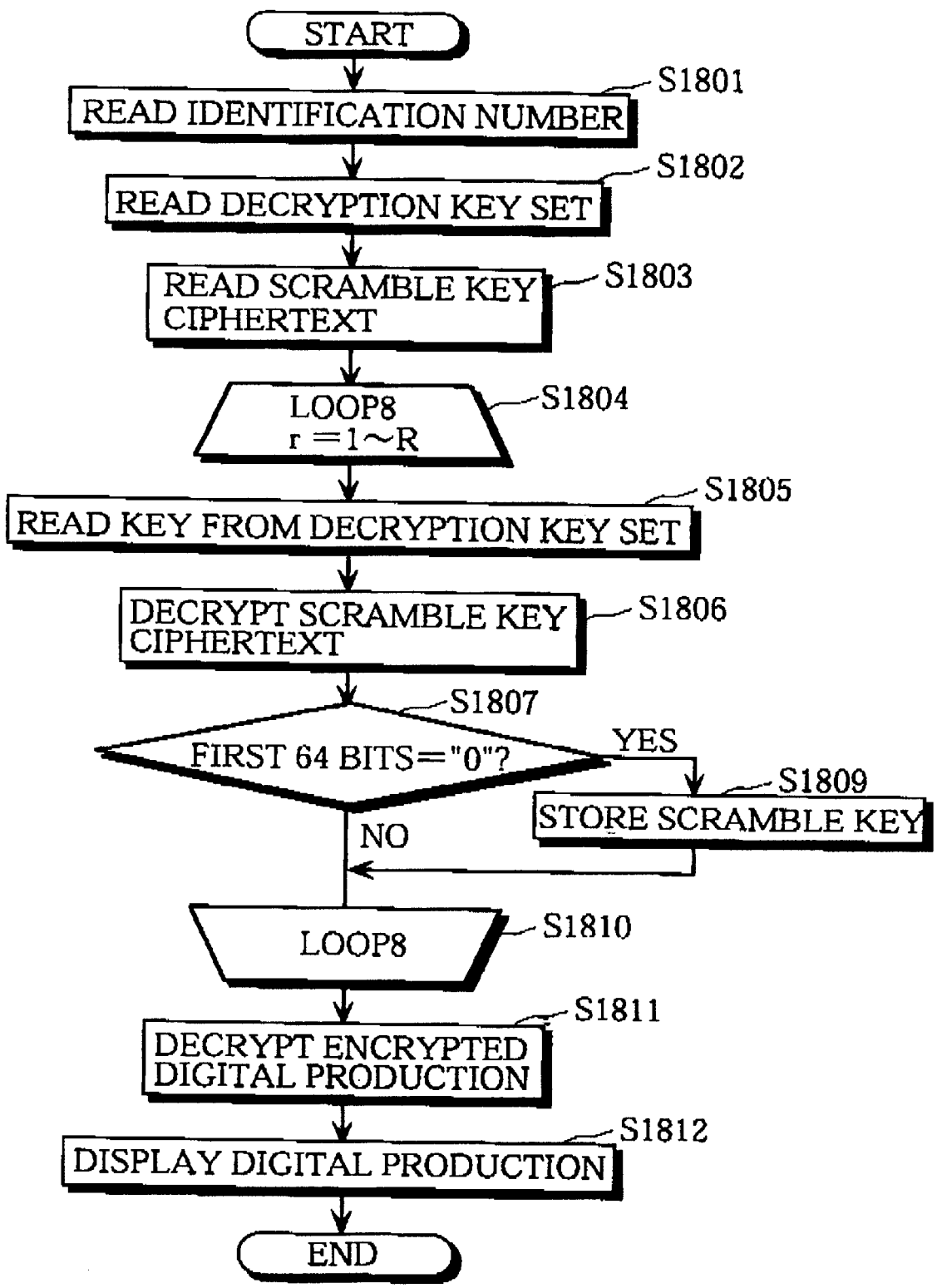

ENCRYPTION SYSTEM CAPABLE OF SPECIFYING A TYPE OF AN ENCRYTION DEVICE THAT PRODUCED A DISTRIBUTION MEDIUM

BACKGROUND OF THE INVENTION

1. Field of the Invention

The present invention relates to an encryption system where digital productions such as digitized documents, audio, images, or programs are encrypted and distributed via transmission mediums or storage mediums, and especially relates to a technique for managing a plurality of types of encryption devices and decryption devices using a single key management device.

2. Description of the Prior Art

When distributing digital productions such as digitized documents, audio, images, or programs on the market, it is necessary to protect the digital productions against unauthorized use. For this aim, a digital production is conventionally encrypted in an encryption device using a secret encryption key and distributed via a transmission or storage medium (hereinafter, distribution medium), the encrypted digital production then being decrypted in a decryption device using a decryption key.

However, there is a danger that a third party may illegally decode the decryption key and use it to decrypt the encrypted digital production, or the third party may produce copies of the distribution medium.

Accordingly, the first problem concerning the encryption systems is to prevent unauthorized decoding of the decryption key.

In view of the first problem, it is desirable to use a plurality of encryption devices that each have different encryption keys. Also, the number of encryption keys possessed by one encryption device is preferably smaller than the total number of keys possessed by a key management device.

The second problem concerning the encryption systems is that it a decryption key stored in one decryption device is decoded by the unauthorized third party, it can be used to decrypt the encrypted digital production in other decryption devices.

In view of the second problem, it is desirable to provide different keys for different decryption devices. Here, an encryption system has been proposed for successful decryption of encrypted data in various types of decryption devices. In this system, each encryption device stores different encryption keys corresponding to all decryption devices and produces a ciphertext for each of the encryption keys. On receiving a plurality of ciphertexts generated by the encryption device, each decryption device identifies and retrieves a ciphertext which was encrypted using an encryption key corresponding to its device type and decrypts the retrieved ciphertext. Systems for assigning a plurality of decryption keys to each decryption device have also been proposed.

The third problem concerning the encryption systems is that, when there is the suspicion that a distribution medium has been copied without proper authorization, it is necessary to specify a type of an encryption device which produced the distribution medium used to make the copy, in order to specify the producer and the distribution channel of the medium.

SUMMARY OF THE INVENTION

In view of the first and second problems, the present invention aims to provide an encryption system where a plurality of different encryption devices each store different encryption keys and a plurality of different decryption devices each store different decryption keys, wherein the number of encryption keys stored in one encryption device is smaller than the total number of keys stored in the key management device. Also, in view of the third problem, the present invention aims to provide an encryption system where, when a distribution medium appears to have been copied by an unauthorized third party, it is possible to identify a type of an encryption device which produced the copied distribution medium.

The above objects can be fulfilled by an encryption system comprising a key management device, encryption devices of M types, and decryption devices of N types, wherein M and N are both integers that are no less than 2, the encryption system being characterized in that: the key management device stores M encryption key sets, N decryption key sets, and N identification numbers, distributes a different one of the M encryption key sets to all encryption devices of a same type out of the M types, distributes a different one of the N decryption key sets to all decryption devices of a same type out of the N types, and distributes a different one of the N identification numbers to all decryption devices of the same type out of the N types, wherein each encryption key set includes N encryption keys, and each decryption key set includes a predetermined number of decryption keys; each encryption device encrypts digital data using a scramble key to generate encrypted digital data, encrypts the scramble key using each of N encryption keys included in a distributed encryption key set to generate N encrypted scramble keys, and writes the encrypted digital data and the N encrypted scramble keys into a distribution medium; and each decryption device decrypts an encrypted scramble key, which is identified by a distributed identification number, among the N encrypted scramble keys written in the distribution medium, using each of the predetermined number of decryption keys included in a distributed decryption key set, selects a decryption key that correctly decrypts the encrypted scramble key according to a predetermined criterion, and decrypts the encrypted digital data written in the distribution medium using the scramble key obtained by correctly decrypting the encrypted scramble key to obtain the digital data, and wherein the key management device includes: a first ciphertext read unit for reading an encrypted scramble key from the distribution medium; a decryption key set read unit for reading a decryption key set from the N decryption key sets; a decryption selection unit for decrypting the read encrypted scramble key using each of the predetermined number of decryption keys included in the read decryption key set in order to select a decryption key, among the predetermined number of decryption keys, that correctly decrypts the encrypted scramble key according to the predetermined criterion; a first repeat control unit for controlling the first ciphertext read unit, the decryption key set read unit, and the decryption selection unit to respectively repeat an encrypted scramble key reading, a decryption key set reading, and an encrypted scramble key decryption, until the N encrypted scramble keys are read from the distribution medium, wherein N decryption keys are selected as a result of a control by the first repeat control unit; and a key pattern detection unit for detecting an encryption key set, among the M encryption key sets, that matches the selected N decryption keys and identifying an encryption device type, among the M types, specified by the detected encryption key set.

With the stated construction, each different decryption device is provided with a different decryption key set, so that it is difficult for a third party to decode ciphertexts. Also, even if the third party analyzes a decryption device of one type and obtains decryption keys, these decryption keys cannot be used in decryption devices of the other types, so that these decryption devices remain secure. Also, the key management device can identify a type of an encryption device that produced a copied distribution medium.

Here, the key management device may include: a first decryption key storage unit for storing the N decryption key sets which each include the predetermined number of decryption keys; an encryption key generation unit for generating an encryption key set which includes N encryption keys by selecting a decryption key, from each decryption key set stored in the first decryption key storage unit, as an encryption key according to a first predetermined method; a first encryption key storage unit for storing the generated encryption key set; a second repeat control unit for controlling the encryption key generation unit to repeat an encryption key set generation until the M encryption key sets are generated, wherein the first encryption key storage unit stores the generated M encryption key sets; an encryption key set distribution unit for distributing a different one of the M encryption key sets stored in the first encryption key storage unit to all encryption devices of the same type out of the M types; a decryption key set distribution unit for distributing a different one of the N decryption key sets stored in the first decryption key storage unit to all decryption devices of the same type out of the N types; and an identification number distribution unit for distributing a different one of the N identification numbers to all decryption devices of the same type out of the N types.

Here, the first predetermined method may be to randomly select the decryption key from each decryption key set stored in the first decryption key storage unit.

With the stated construction, the N encryption keys assigned to each encryption device are determined by randomly selecting a decryption key from the predetermined number of decryption keys in a decryption key set assigned to each decryption device. Accordingly, different encryption key sets can be provided for a large number of encryption devices.

Here, the first predetermined method may be to randomly and uniformly select the decryption key from each decryption key set stored in the first decryption key storage unit.

With the stated construction, the N encryption keys assigned to each encryption device are determined by randomly and uniformly selecting a decryption key from the predetermined number of decryption keys in a decryption key set assigned to each decryption device. Accordingly, even if the third party obtains encryption keys stored in an encryption device of one type, it cannot detect encryption keys in encryption devices of the other types using the obtained encryption keys.

Here, the key management device may include: a first decryption key storage unit for storing the N decryption key sets which each include the predetermined number of decryption keys; an encryption key generation unit for generating an encryption key set which includes N encryption keys by selecting a decryption key, from each decryption key set stored in the first decryption key storage unit, as an encryption key according to a first predetermined method; a first encryption key storage unit for storing the generated encryption key set; a second repeat control unit for controlling the encryption key generation unit to repeat an encryption key set generation until the M encryption key sets are generated, wherein the first encryption key storage unit stores the generated M encryption key sets; an encryption key set distribution unit for distributing a different one of the M encryption key sets stored in the first encryption key storage unit to all encryption devices of the same type out of the M types; a decryption key set distribution unit for distributing a different one of the N decryption key sets stored in the first decryption key storage unit to all decryption devices of the same type out of the N types; and an identification number distribution unit for distributing a different one of the N identification numbers to all decryption devices of the same type out of the N types, and wherein each decryption device includes: an identification number storage unit for storing the identification number distributed from the key management device; a second decryption key storage unit for storing the decryption key set distributed from the key management device, the decryption key set including the predetermined number of decryption keys; a second ciphertext read unit for reading the encrypted scramble key identified by the identification number from the distribution medium; a digital data read unit for reading the encrypted digital data from the distribution medium; a second decryption key read unit for reading a decryption key from the decryption key set stored in the second decryption key storage unit; a second decrypted text generation unit for decrypting the read encrypted scramble key using the read decryption key to generate a decrypted text; a second decrypted text check means for checking whether the decrypted text is a correct decrypted text according to the predetermined criterion, wherein the correct decrypted text includes the scramble key; a fourth repeat control unit for controlling the second decryption key read unit, the second decrypted text generation unit, and the second decrypted text check unit to respectively repeat a decryption key reading, an encrypted scramble key decryption, and a decrypted text checking until the predetermined number of decryption keys are read from the decryption key set; and a digital data decryption unit for decrypting the encrypted digital data using the obtained scramble key to obtain the digital data.

With the stated construction, the key management device distributes information for identifying an encrypted scramble key that corresponds to each decryption device among the N encrypted scramble keys generated by each encryption device, to the corresponding decryption device. Accordingly, each decryption device can identify the encrypted scramble key using the information.

Here, each encryption device may include: a second encryption key storage unit for storing the encryption key set distributed from the key management device, the encryption key set including the N encryption keys; a scramble key generation unit for generating the scramble key; a digital data encryption unit for receiving the digital data from outside and encrypting the digital data using the scramble key to generate the encrypted digital data; a key encryption unit for encrypting, according to a second predetermined method, the scramble key using each of the N encryption keys included in the encryption key set in the second encryption key storage unit in order to generate the N encrypted scramble keys; and a medium write unit for writing the encrypted digital data and the N encrypted scramble keys into the distribution medium, and wherein each decryption device includes: an identification number storage unit for storing the identification number distributed from the key management device; a second decryption key storage unit for storing the decryption key set distributed from the key management device, the decryption key set including the predetermined number of decryption keys; a second ciphertext read unit for reading the encrypted scramble key identified by the identification number from the distribution medium; a digital data read unit for reading the encrypted digital data from the distribution medium; a second decryption key read unit for reading a decryption key from the decryption key set stored in the second decryption key storage unit; a second decrypted text generation unit for decrypting the read encrypted scramble key using the read decryption key to generate a decrypted text; a second decrypted text check unit for checking whether the decrypted text is a correct decrypted text according to the predetermined criterion, wherein the correct decrypted text includes the scramble key; a fourth repeat control unit for controlling the second decryption key read unit, the second decrypted text generation unit, and the second decrypted text check unit to respectively repeat a decryption key reading, an encrypted scramble key decryption, and a decrypted text checking until the predetermined number of decryption keys are read from the decryption key set; and a digital data decryption unit for decrypting the encrypted digital data using the obtained scramble key to obtain the digital data.

Here, the second predetermined method may be to combine the scramble key with a set of fixed information and encrypt a combination of the scramble key and the set of fixed information, and wherein the predetermined criterion is that the decrypted text includes the set of fixed information.

With the stated construction, the encryption device combines the scramble key with the set of fixed information and encrypts the combination to generate a ciphertext. The decryption device decrypts the ciphertext using each decryption key and obtains the set of fixed information, with which the decryption device judges that the ciphertext is correctly decrypted. Accordingly, the decryption key that correctly decrypts the ciphertext can easily be specified.

Here, the second predetermined method may be to encrypt the scramble key and a set of fixed information to respectively generate the N encrypted scramble keys and N sets of encrypted fixed information, wherein the medium write unit writes the encrypted digital data, the N encrypted scramble keys, and the N sets of encrypted fixed information into the distribution medium, wherein each decryption device further includes: an encrypted fixed information read unit for reading a set of encrypted fixed information, among the N sets of encrypted fixed information, that is identified by the identification number; and an encrypted fixed information decryption unit for decrypting the set of encrypted fixed information using each of the predetermined number of decryption keys in the decryption key set, and wherein the predetermined criterion is that the set of fixed information is obtained as a result of decrypting the set of encrypted fixed information.

With the stated construction, when encrypting the scramble key, the encryption device also encrypts the set of fixed information to generate the N sets of encrypted fixed information. When decrypting the encrypted scramble key, the decryption device decrypts the set of encrypted fixed information, identified by its identification number, using each decryption key and obtains the set of fixed information, with which the decryption device judges that the encrypted scramble key is correctly decrypted. Accordingly, the decryption key that correctly decrypts the encrypted scramble key can easily be specified.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 18 is a flowchart showing the operation of the decryption device 300.

DESCRIPTION OF THE PREFERRED EMBODIMENT

The following is an explanation of an encryption system 10 of the embodiment of the present invention.
1. Construction of Encryption System 10

Figure 1:
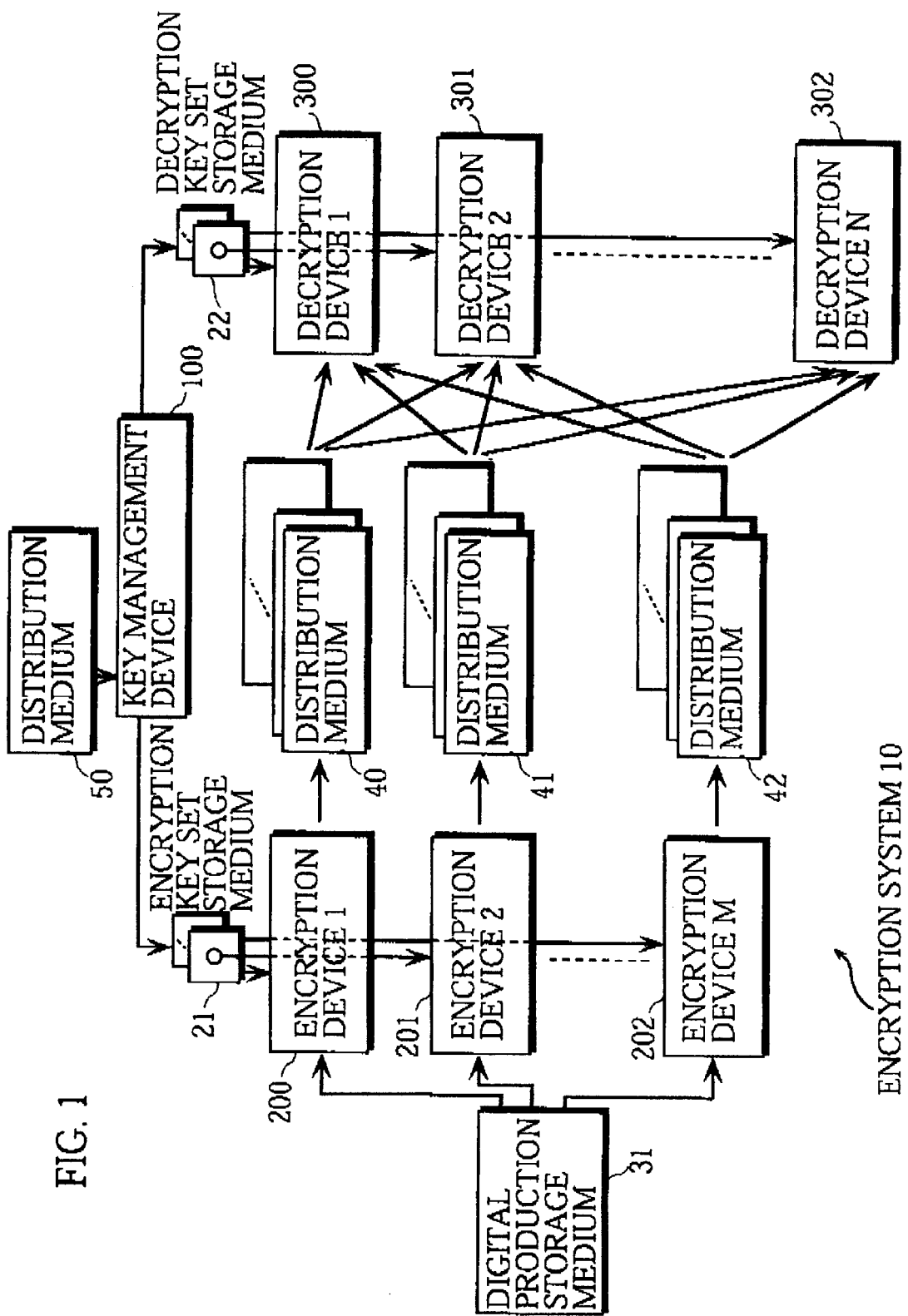
FIG. 1 is a block diagram showing the construction of the encryption system 10 of the embodiment of the present invention.

FIG. 1 is a block diagram showing the construction of the encryption system 10 of the embodiment of the present invention.

As shown in the figure, the encryption system 10 includes a key management device 100, M different encryption devices 200, 201, . . . , 202, and N different decryption devices 300, 301, . . . , 302. Here, N and N are both integers equal to or larger than 2. Note that in the present example, only one device of each of the M types (encryption device) or N types (decryption device) is shown, although in reality many devices of each type may be provided. However, the provision of many devices of a same type does not affect the operation of the present invention, and so for ease of explanation only one device of each type is used.

The key management device 100 generates M types of encryption key set storage mediums 21 and gives a different one to each of the M different encryption devices 200–202. The key management device 100 also generates N types of decryption key set storage mediums 22 and gives a different one to each of the N different decryption devices 300–302. The M different encryption devices 200–202 each encrypt a digital production stored in a digital production storage medium 31 and write the encrypted digital production into one of M different storage mediums 40, 41, . . . , 42. The N different decryption devices 300–302 each read an encrypted digital production from any or the M different storage mediums 40–42 and perform decryption.

The key management device also specifies a type of an encryption device that produced a distribution medium 50.

The construction of each device included in the encryption system 10 is explained in detail below.

1.1. Construction of Key Management Device 100

Figure 2:
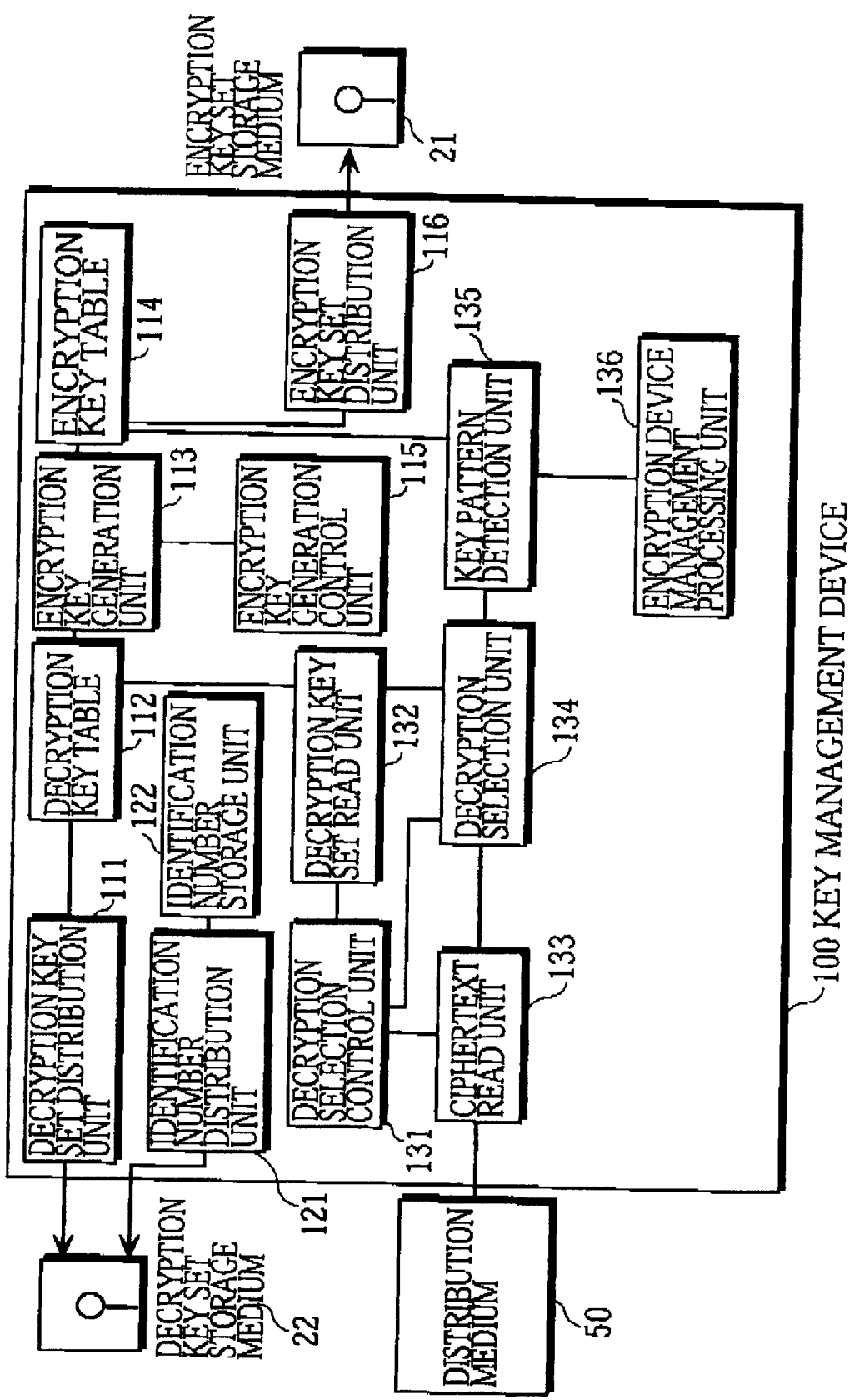
FIG. 2 is a block diagram showing the construction of the key management device 100 in the encryption system 10 shown in FIG.
Figure 3:
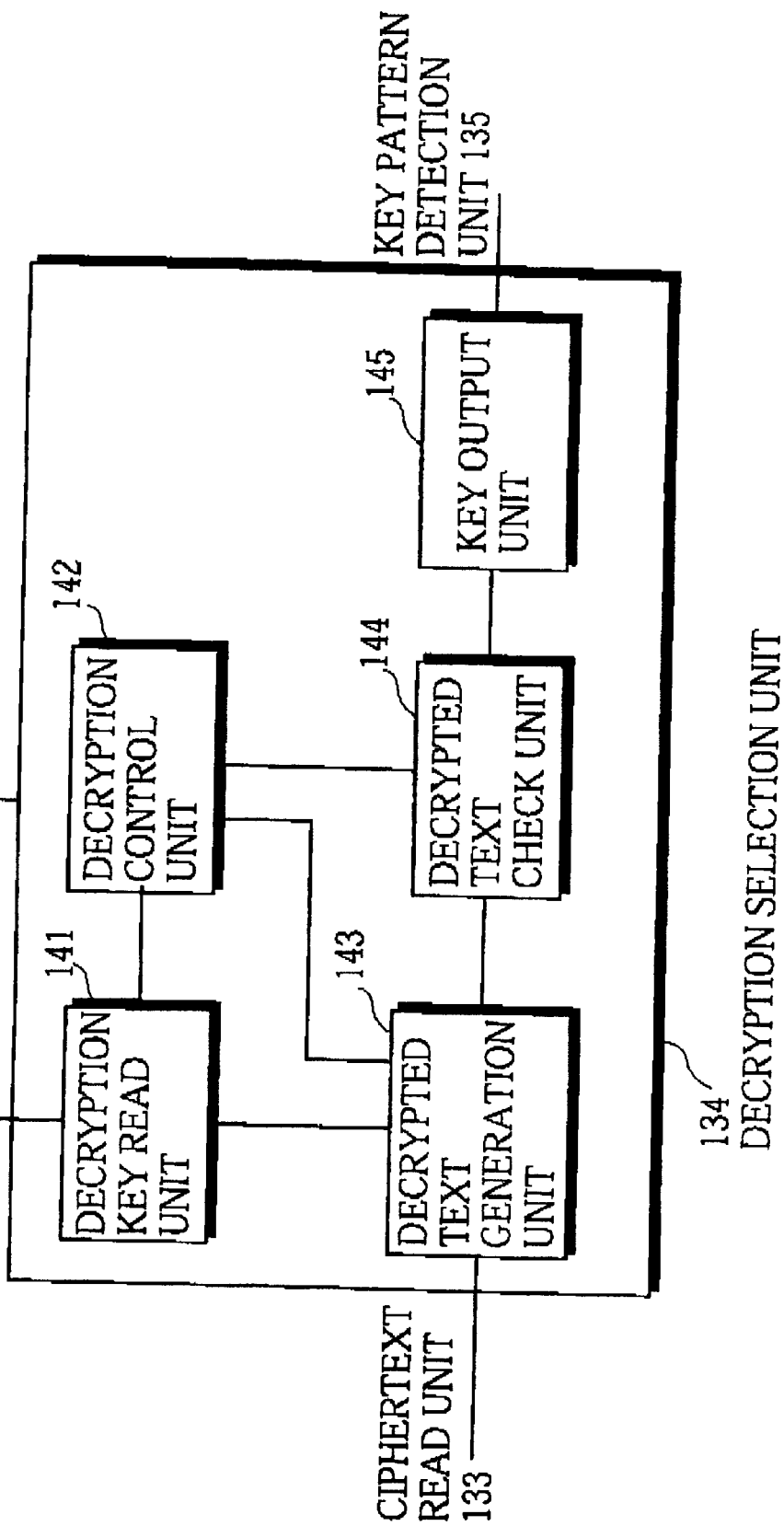
FIG. 3 is a block diagram showing the construction of the decryption selection unit 134 in the key management device 100 shown in FIG. 2.

As shown in FIG. 2, the key management device 100 includes a decryption key set distribution unit 111, a decryption key table 112, an encryption key generation unit 113, an encryption key table 114, an encryption key generation control unit 115, an encryption key set distribution unit 116, an identification number distribution unit 121, an identification number storage unit 122, a decryption selection control unit 131, a decryption key set read unit 132, a ciphertext read unit 133, a decryption selection unit 134, a key pattern detection unit 135, and an encryption device management processing unit 136. As shown in FIG. 3, the decryption selection unit 134 includes a decryption key read unit 141, a decryption control unit 142, a decrypted text generation unit 143, a decrypted text check unit 144, and a key output unit 145.

The key management device 100 has two main functions. One is to generate and distribute encryption keys, decryption keys, and identification numbers to the encryption and decryption devices. The other is to specify a type of an encryption device that produced a distribution medium.

1.1.1. Decryption Key Table 112

Figure 4:
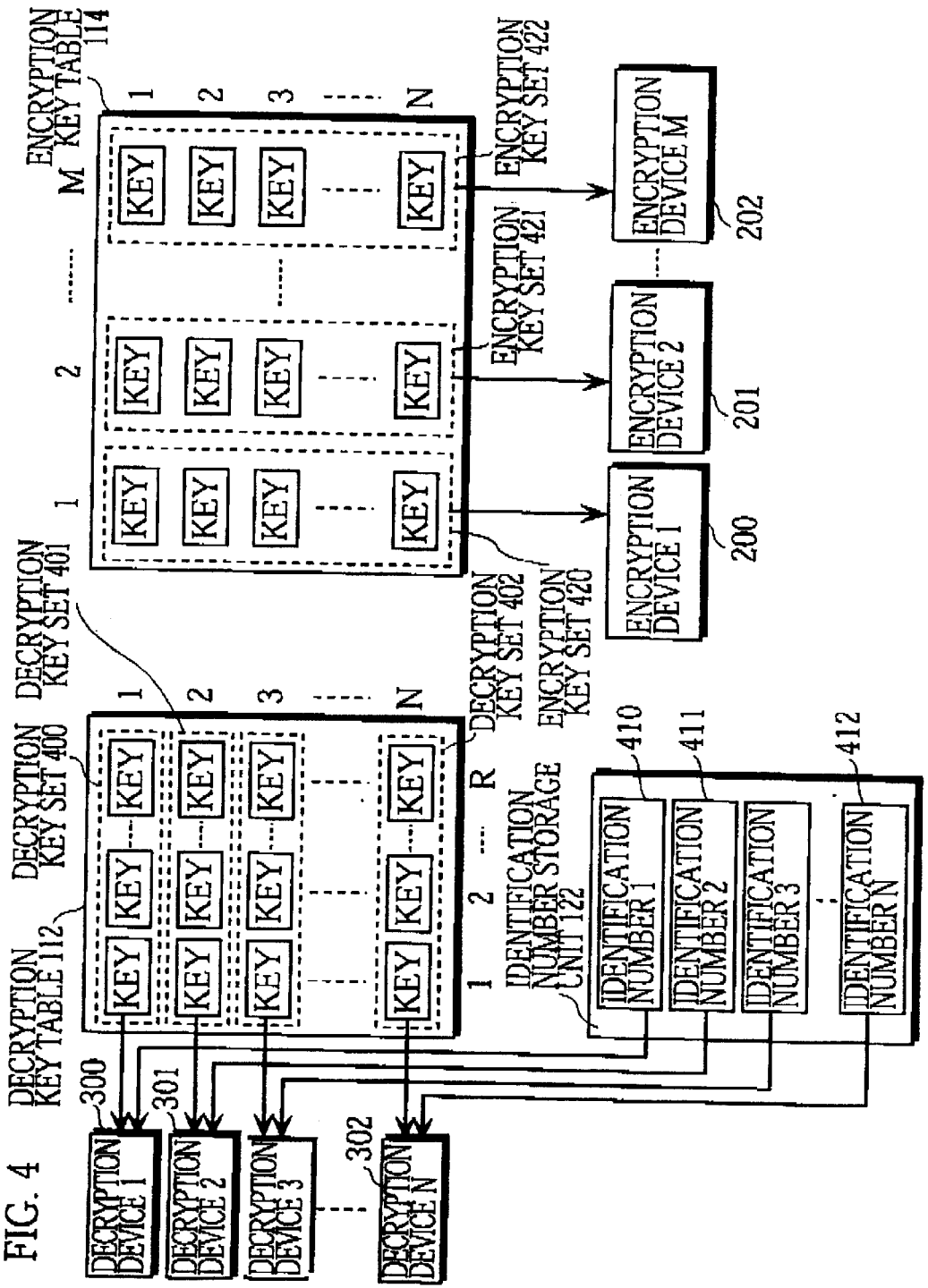
FIG. 4 shows the constructions of the decryption key table 112 and the encryption key table 114 in the key management device 100 shown in FIG. 2.

In FIG. 4, the decryption key table 112 stores N decryption key sets 400, 401, . . . , 402 in advance. Each decryption key set includes R (an integer no less than 2) decryption keys that are used to decrypt ciphertexts. Each decryption key has 128 bits in the present embodiment.

The N decryption key sets 400–402 are respectively assigned the numbers 1, 2, . . . , and N. The R decryption keys included in each decryption key set are respectively assigned the numbers 1,2, . . . , R. A "j"th decryption key included in an "i"th decryption key set is hereinafter expressed as "$K_{ij}$".

The N decryption key sets 400–402 are respectively assigned to the N different decryption devices 300–302.

Figure 5:
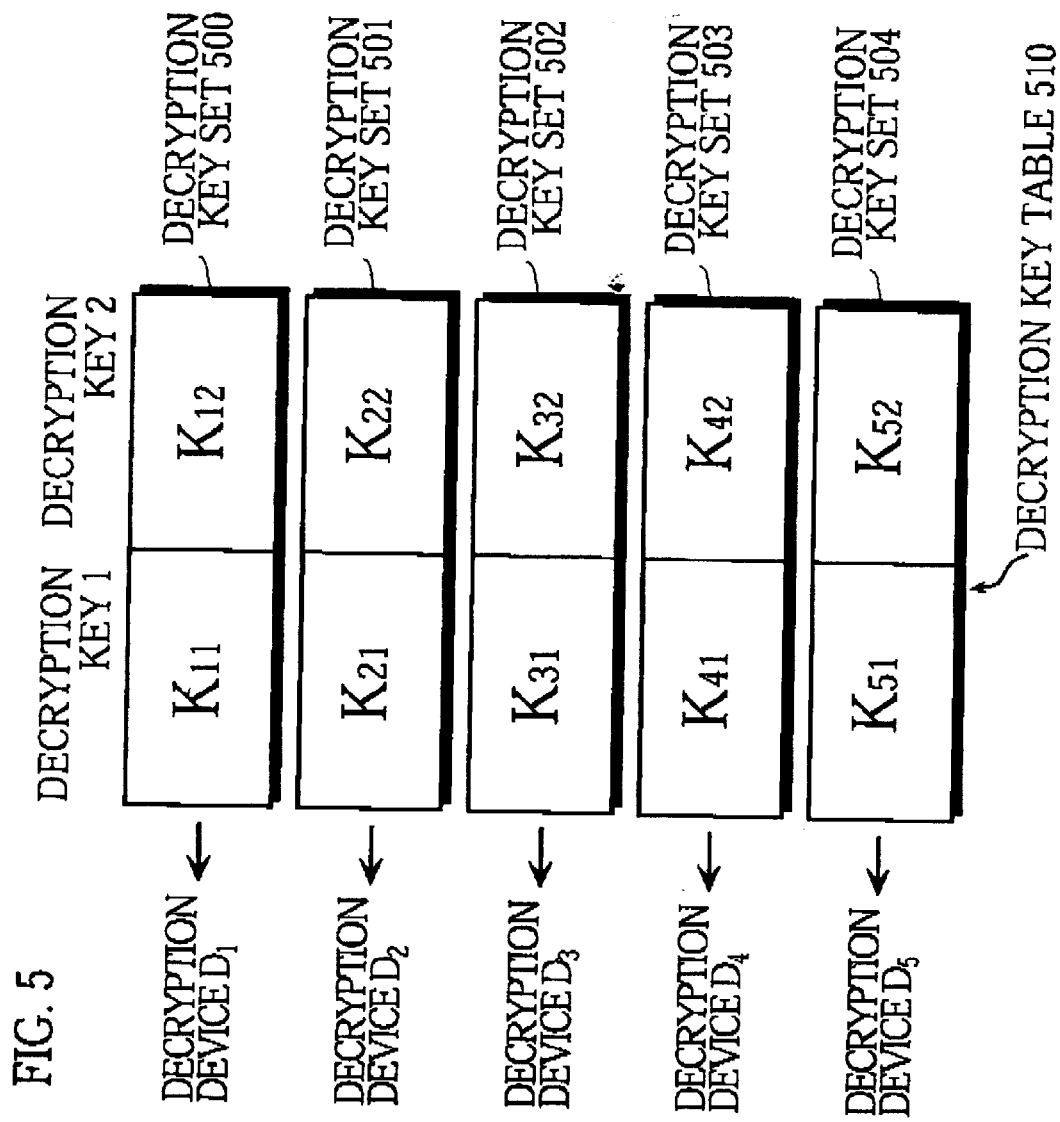
FIG. 5 shows an example of the decryption key table 112 in the key management device 100.

FIG. 5 shows an example of the decryption key table 112. In the figure, a decryption key table 510 stores five decryption key sets 500–504 which each include two decryption keys. The decryption key sets 500–504 are respectively distributed to five different decryption devices $D_1$–$D_5$.

1.1.2. Encryption Key Generation Control Unit 115

The encryption key generation control unit 115 controls the encryption key generation unit 113 to successively generate M encryption key sets 420, 421, . . . , 422 which each include N encryption keys.

More specifically, the encryption key generation control unit 115 successively outputs a number, from 1 to M, of an encryption key set to be generated to the encryption key generation unit 113.

The M encryption key sets 420–422 are respectively assigned the numbers 1, 2, . . . , M. The N encryption keys included in each encryption key set are respectively assigned the numbers 1, 2, . . . , N.

1.1.3. Encryption Key Generation Unit 113

On receiving the number 1 from the encryption key generation control unit 115, the encryption key generation unit 113 generates the first encryption key set 420 as follows in accordance with the control by the encryption key generation control unit 115.

The encryption key generation unit 113 randomly selects a key from R decryption keys included in the first decryption key set 400 in the decryption key table 112 and writes the selected key into the encryption key table 114 as a first encryption key of the first encryption key set 420. Next, the encryption key generation unit 113 randomly selects a key from R decryption keys included in the second decryption key set 401 in the decryption key table 112 and writes the selected key into the encryption key table 114 as a second encryption key of the first encryption key set 420. In the same way, the encryption key generation unit 113 randomly selects a key from each of the third to Nth decryption key sets 402 and writes the selected key as third to Nth encryption keys of the first encryption key set 420. As a result, the encryption key set 420 including N encryption keys is generated in the encryption key table 114.

Next, on receiving the numbers 2-M from the encryption key generation control unit 115, the encryption key generation unit 113 generates the second to Mth encryption key sets 421–422 in the encryption key table 114 in the same way as the first encryption key set 420.

1.1.4. Encryption Key Table 114

As shown in FIG. 4, the encryption key table 114 stores the M encryption key sets 420–422. Each encryption key set includes N encryption keys that are used to encrypt plaintexts. Each encryption key is the same as one of the decryption keys stored in the decryption key table 112.

The M encryption key sets 420–422 are respectively assigned to the M different encryption devices 200–202.

Figure 6:
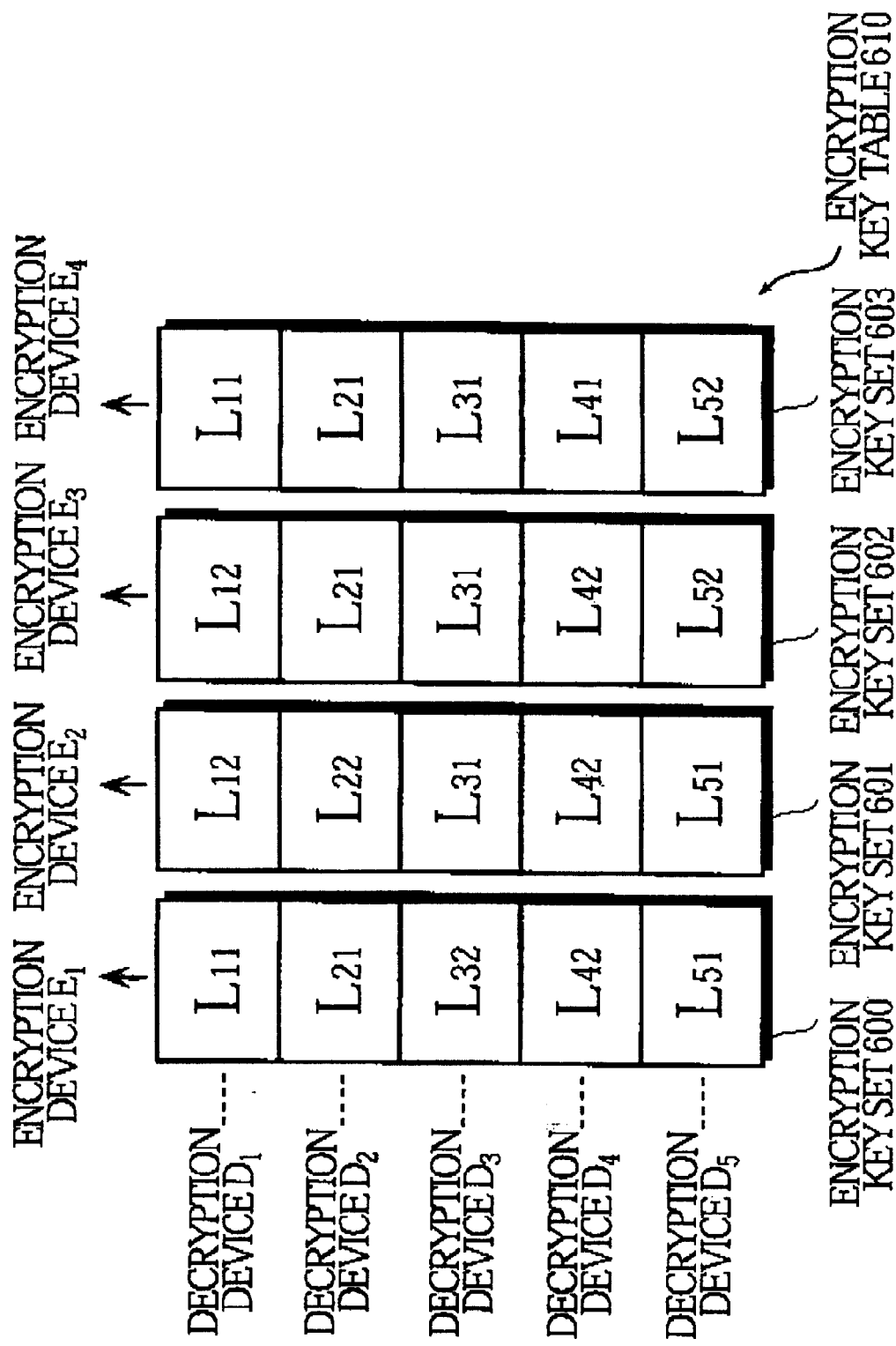
FIG. 6 shows an example of the encryption key table 114 in the key management device 100.

FIG. 6 shows an example of the encryption key table 114 in the figure, an encryption key table 610 stores four encryption key sets 600–603 which each include five encryption keys. The encryption key sets 600–603 are respectively distributed to four different encryption devices $E_1$–$E_4$.

1.1.5 Decryption Key Set Distribution Unit 111

The decryption key set distribution unit 111 reads the first decryption key set 400 from the decryption key table 112 and writes it into a first decryption key set storage medium. The decryption key set distribution unit 111 then reads the second decryption key set 401 from the decryption key table 112 and writes it into a second decryption key set storage medium. In the same way, the decryption key set distribution unit 111 reads the third to Nth decryption key sets 402 and respectively writes them into third to Nth decryption key set storage mediums.

As a result, the N decryption key sets 400–402 in the decryption key table 112 are written into the N decryption key set storage mediums.

1.1.6. Encryption Key Set Distribution Unit 116

The encryption key set distribution unit 116 reads the first encryption key set 420 from the encryption key table 114 and writes it into a first encryption key set storage medium. The encryption key set distribution unit 116 then reads the second encryption key set 421 from the encryption key table 114 and writes it into a second encryption key set storage medium. In the same way, the encryption key set distribution unit 116 reads the third to Mth encryption key sets 422 and respectively writes them into third to Mth encryption key set storage mediums.

As a result, the M encryption key sets 420–422 in the encryption key table 114 are written into the M encryption key set storage mediums.

1.1.7 Identification Number Storage Unit 122

The identification number storage unit 122 stores N identification numbers which correspond to the N different decryption devices 300–302. Before a decryption device decrypts an encrypted digital production written in a distribution medium, the decryption device uses its identification number to identify a scramble key ciphertext (explained later) that corresponds to the decryption device among N scramble key ciphertexts written in the distribution medium.

1.1.8. Identification Number Distribution Unit 121

The identification number distribution unit 121 reads an identification number corresponding to one of the N different decryption devices 300–302 from the identification number storage unit 122 and writes the number into a decryption key set storage medium which is to be distributed to the decryption device. This process is repeated for the other decryption devices.

1.1.9. Decryption Selection Control Unit 131

The decryption selection control unit 131 controls the ciphertext read unit 133, the decryption key set read unit 132, and the decryption selection unit 134 to respectively repeat a scramble key ciphertext reading, a decryption key set reading, and a scramble key ciphertext decryption N times, until N scramble key ciphertexts are all read from the distribution medium 50. Here, a scramble key means a key used to encrypt a digital production in each encryption device, wherein a scramble key plaintext (a plaintext including the scramble key) is encrypted using each of N encryption keys stored in each encryption device. Accordingly, a scramble key ciphertext means a ciphertext that includes an encrypted scramble key. The scramble key ciphertext will be explained in detail later.

The decryption selection control unit 131 first controls the ciphertext read unit 133 to read a first scramble key ciphertext and then controls the decryption key set read unit 132 to read the first decryption key set 400. Next, the decryption selection control unit 131 controls the decryption selection unit 134 to decrypt the first scramble key ciphertext using R decryption keys in the first decryption key set 400 and select a decryption key, from the R decryption keys, that correctly decrypts the first scramble key ciphertext according to a predetermined criterion (explained later).

The decryption selection control unit 131 repeats the same control for second to Nth scramble key ciphertexts.

As a result, N decryption keys that correctly decrypt the N scramble key ciphertexts are selected.

1.1.10. Ciphertext Read Unit 133

On receiving a scramble key ciphertext number from the decryption selection control unit 131, the ciphertext read unit 133 reads a scramble key ciphertext specified by the number from the distribution medium 50.

1.1.11. Decryption Key Set Read Unit 132

On receiving a decryption key set number from the decryption selection control unit 131, the decryption key set read unit 132 reads a decryption key set specified by the number from the decryption key table 112.

1.1.12. Decryption Selection Unit 134

In accordance with the control by the decryption selection control unit 131, the decryption selection unit 134 decrypts the scramble key ciphertext read by the ciphertext read unit 133 using each of R decryption keys in the decryption key set read by the decryption key set read unit 132. The decryption selection unit 134 then selects a decryption key that correctly decrypts the scramble key ciphertext from the R decryption keys according to the predetermined criterion.

The following is an explanation of the decryption key read unit 141, the decryption control unit 142, the decrypted text generation unit 142, the decrypted text check unit 144, and the key output unit 145 included in the decryption selection unit 134, with reference to FIG. 3

(1) Decryption Key Read Unit 141

On receiving a decryption key number from the decryption control unit 142, the decryption key read unit 141 reads a decryption key specified by the number from the R decryption keys in the decryption key set read by the decryption key set read unit 132.

(2) Decrypted Text Generation Unit 143

The decrypted text generation unit 143 decrypts the scramble key ciphertext read by the ciphertext read unit 133 using the decryption key read by the decryption key read unit 141 to generate a scramble key decrypted text (decrypted text obtained by decrypting the scramble key ciphertext) in accordance with the control by the decryption control unit 142.

Note that the decrypted text generation unit 143 is constructed in the same way as the decrypted text generation unit 306 (explained later) included in the decryption device 300 and thus is not explained here.

(3) Decrypted Text Check Unit 144

In accordance with the control by the decryption control unit 142, the decrypted text check unit 144 checks the scramble key decrypted text generated by the decrypted text generation unit 143 to judge whether it is a correct decrypted text according to the predetermined criterion.

Figure 7:
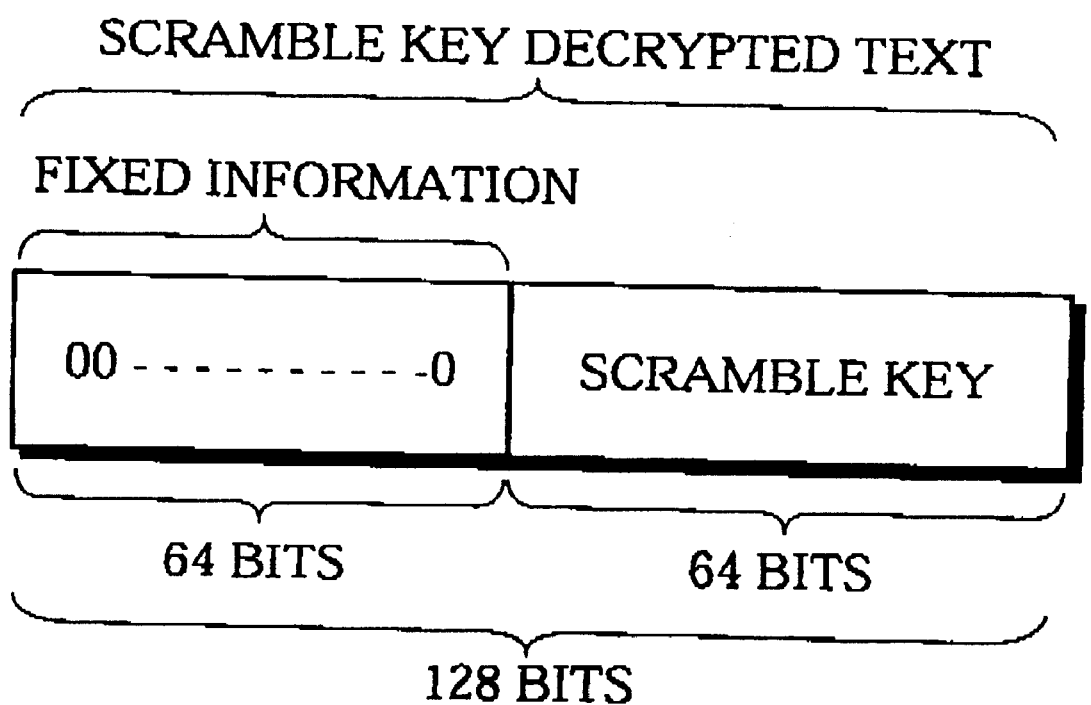
FIG. 7 shows the construction of a scramble key decrypted text generated by the decrypted text generation unit 143 in the decryption selection unit 134 shown in FIG. 3.

Here, the predetermined criterion is that the first 64 bits of a 128-bit scramble key decrypted text are fixed information composed of 64 bits that are all "0", as shown in FIG. 7. Note that the second 64 bits of the 128-bit scramble key decrypted text are the scramble key.

If the first 64 bits of the scramble key decrypted text generated using the decryption key read by the decryption key read unit 141 are all "0", the decrypted text check unit 144 judges that the decryption key is the correct decryption key. If, on the other hand, the first 64 bits of the scramble key decrypted text are not all "0", the decrypted text check unit 144 judges that the decryption key is not the correct decryption key.

(4) Decryption Control Unit 142

The decryption control unit 142 controls the decryption key read unit 141, the decrypted text generation unit 143, and the decrypted text check unit 144 to respectively repeat a decryption key reading, a scramble key ciphertext decryption, and a scramble key decrypted text checking R times, until the R decryption keys are all read from the decryption key set read by the decryption key set read unit 132.

More specifically, the decryption control unit 142 controls the decryption key read unit 141 to read a first decryption key from the decryption key set read by the decryption key set read unit 132 and controls the decrypted text generation unit 143 to decrypt the scramble key ciphertext read by the ciphertext read unit 133 using the first decryption key. The decryption control unit 142 then controls the decrypted text check unit 144 to check whether a scramble key decrypted text generated by the decrypted text generation unit 143 is the correct decrypted text.

The decryption selection control unit 131 repeats the same control for the second to Rth decryption keys.

As a result, a decryption key that correctly decrypts the scramble key ciphertext is selected from the R decryption keys in the decryption key set.

(5) Key Output Unit 145

The key output unit 145 outputs the selected key, which is judged to correctly decrypt the scramble key ciphertext, to the key pattern detection unit 135.

1.1.13. Key Pattern Detection Unit 135

The key pattern detection unit 135 detects an encryption key set that matches the N decryption keys selected as a result of the control by the decryption selection control unit 131 among the M encryption key sets 420–422 stored in the encryption key table 114. The key pattern detection unit 135 then outputs the detected encryption key set number to the encryption device management processing unit 136. As a result, it becomes clear that the distribution medium 50 was produced by an encryption device specified by the number.

1.1.14. Encryption Device Management Processing Unit 136

The encryption device management processing unit 136 stores information on a device number, a device name, and a producer, that correspond to each of the N different encryption devices.

On receiving the detected encryption key set number from the key pattern detection unit 135, the encryption device management processing unit 136 detects a type of an encryption device corresponding to the number. The encryption device management processing unit 136 then retrieves and displays the name and the producer of the detected encryption device type.

1.2. Operation of Key Management Device 100

The following is an explanation of the key generation operation, the key distribution operation, and the encryption device type specification operation performed by the key management device 100.

1.2.1. Key Generation Operation and Key Distribution Operation of Key Management Device 100

Figure 8:
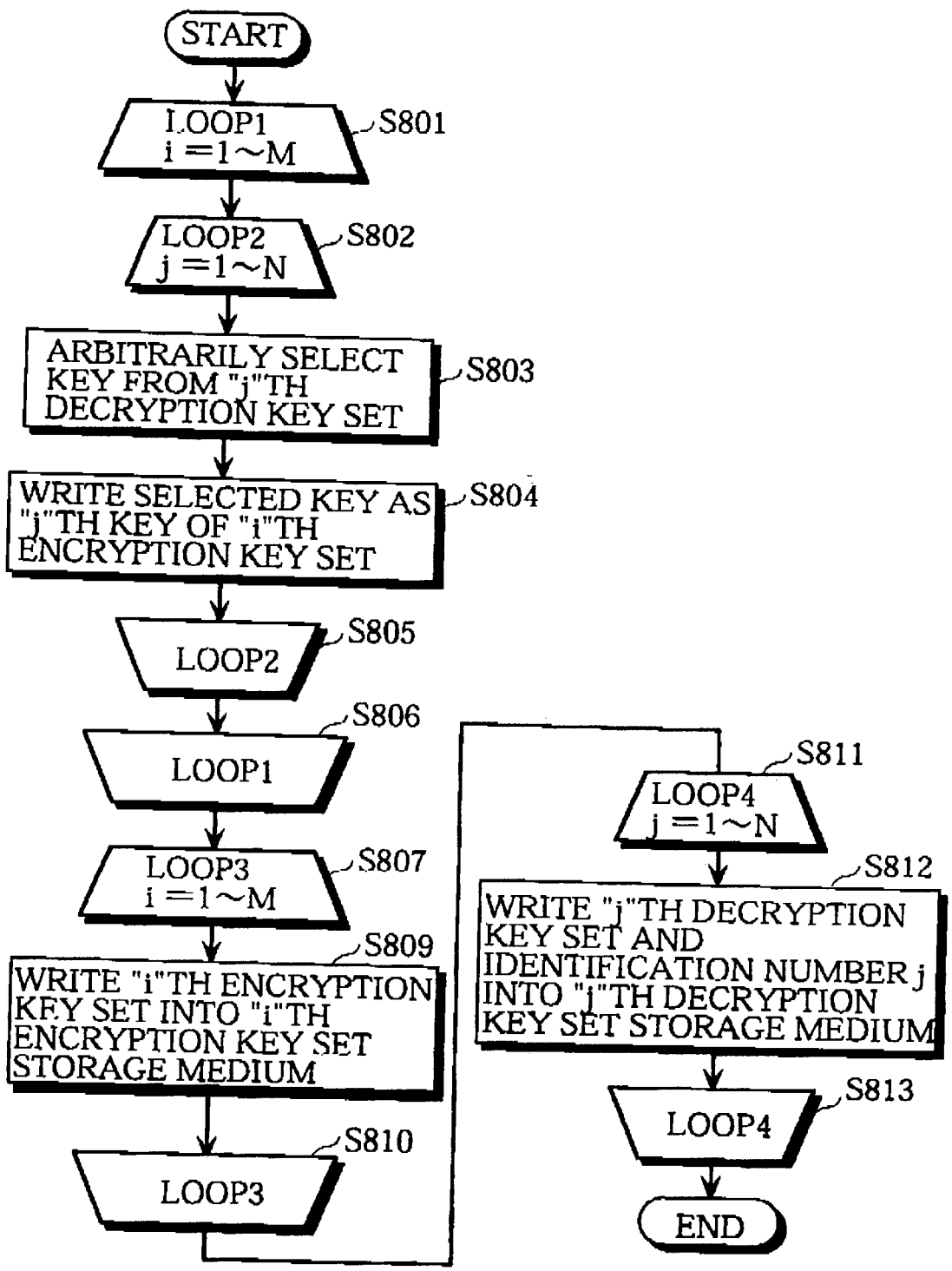
FIG. 8 is a flowchart showing the key generation operation and the key distribution operation by the key management device 100 in the encryption system 10 shown in FIG. 1.

The key generation and distribution performed by the key management device 100 are explained below with reference to FIG. 8.

The encryption key generation control unit 115 controls the encryption key generation unit 113 to generate an encryption key set M times, with an integer counter i being incremented from 1 to M by 1 (Steps S801–S806).

The encryption key generation unit 113 repeats an operation N times, with an integer counter j being incremented from 1 to N by 1 (Steps S802–S805). The operation is composed of randomly selecting a decryption key from R decryption keys in a decryption key set (Step S803) and writing the selected key into the encryption key table 114 as a "j"th encryption key of an "i"th encryption key set (Step S804).

Next, the encryption key set distribution unit 116 writes M encryption key sets generated in the encryption key table 114 respectively into the M encryption key set storage mediums (Steps S807–S810). The decryption key set distribution unit 111 writes the N decryption key sets in the decryption key table 112 and the N identification numbers in the identification number storage unit 122 respectively into the N decryption key set storage mediums (Step S811–S813).

1.2.2. Encryption Device Type Specification Operation of Key Management Device 100

Figure 9:
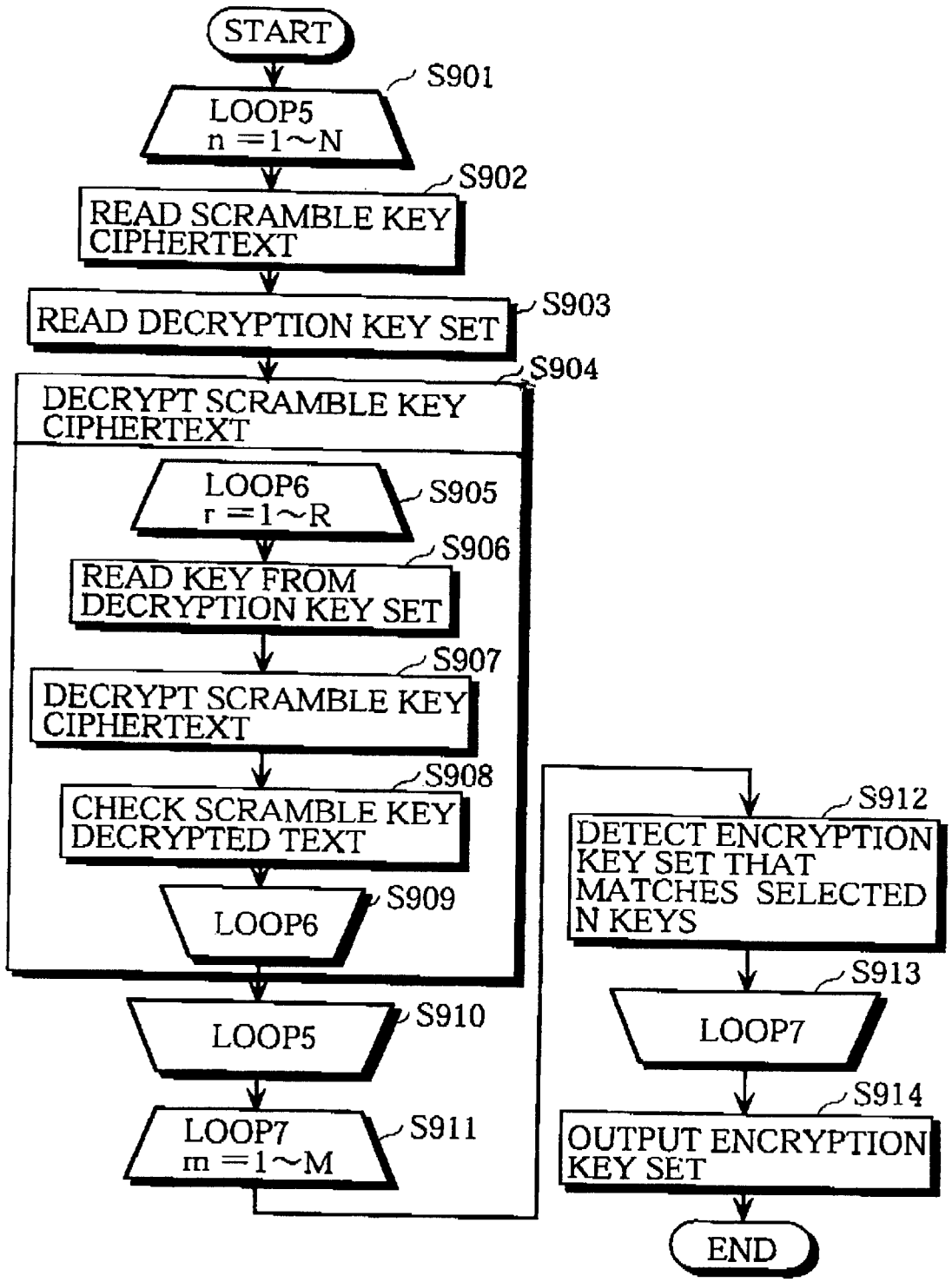
FIG. 9 is a flowchart showing the encryption device type specification operation by the key management device 100.

The encryption device type specification performed by the key management device 100 is explained below with reference to FIG. 9.

The decryption selection control unit 131 controls the ciphertext read unit 133, the decryption key set read unit 132, and the decryption selection unit 134 to repeat an operation N times until N scramble key ciphertexts are read from the distribution medium 50, with an integer counter n being incremented from 1 to N by 1 (Steps S901–S910). In the operation, the ciphertext read unit 133 reads a scramble key ciphertext from the distribution medium 50 (Step S902), the decryption key set read unit 132 reads a decryption key set from the decryption key table 112 (Step S903), and the decryption selection unit 134 decrypts the read scramble key ciphertext using the read decryption key set to select a correct decryption key (Step S904). As a result of repeating this operation N times, N decryption keys that correctly decrypt the respective N scramble key ciphertexts are selected.

Here, in the scramble key ciphertext decryption by the decryption selection unit 134 (Step S904), the decryption control unit 142 control s the decryption key read unit 141, the decrypted text generation unit 143, and the decrypted text check unit 144 to repeat an operation R times until R decryption keys are all read from the decryption key set read by the decryption key set read unit 132, with an integer counter r being incremented from 1 to R by 1 (Steps S905–S909). In the operation, the decryption key read unit 141 reads a decryption key from the decryption key set (Step 3906), the decrypted text generation unit 143 decrypts the scramble key ciphertext using the read decryption key (Step S907), and the decrypted text check unit 144 checks a generated scramble key decrypted text (Step S908).

Next, with an integer counter m being incremented from 1 to M by 1, the key pattern detection unit 135 detects an encryption key set that matches the selected N decryption keys from the M encryption key sets 420–422 in the encryption key table 114 (Steps S911–S913), the detected encryption key set number then being outputted to the encryption device management processing unit 136. The encryption device management processing unit 136 accordingly retrieves and displays an encryption device name and a producer that correspond to the received number (Step S914).

1.3 Construction of Encryption Device 200

The following is an explanation of the construction of the encryption device 200. Note that the encryption devices 201–202 are constructed in the same way as the encryption device 200 and thus are not explained here.

Figure 10:
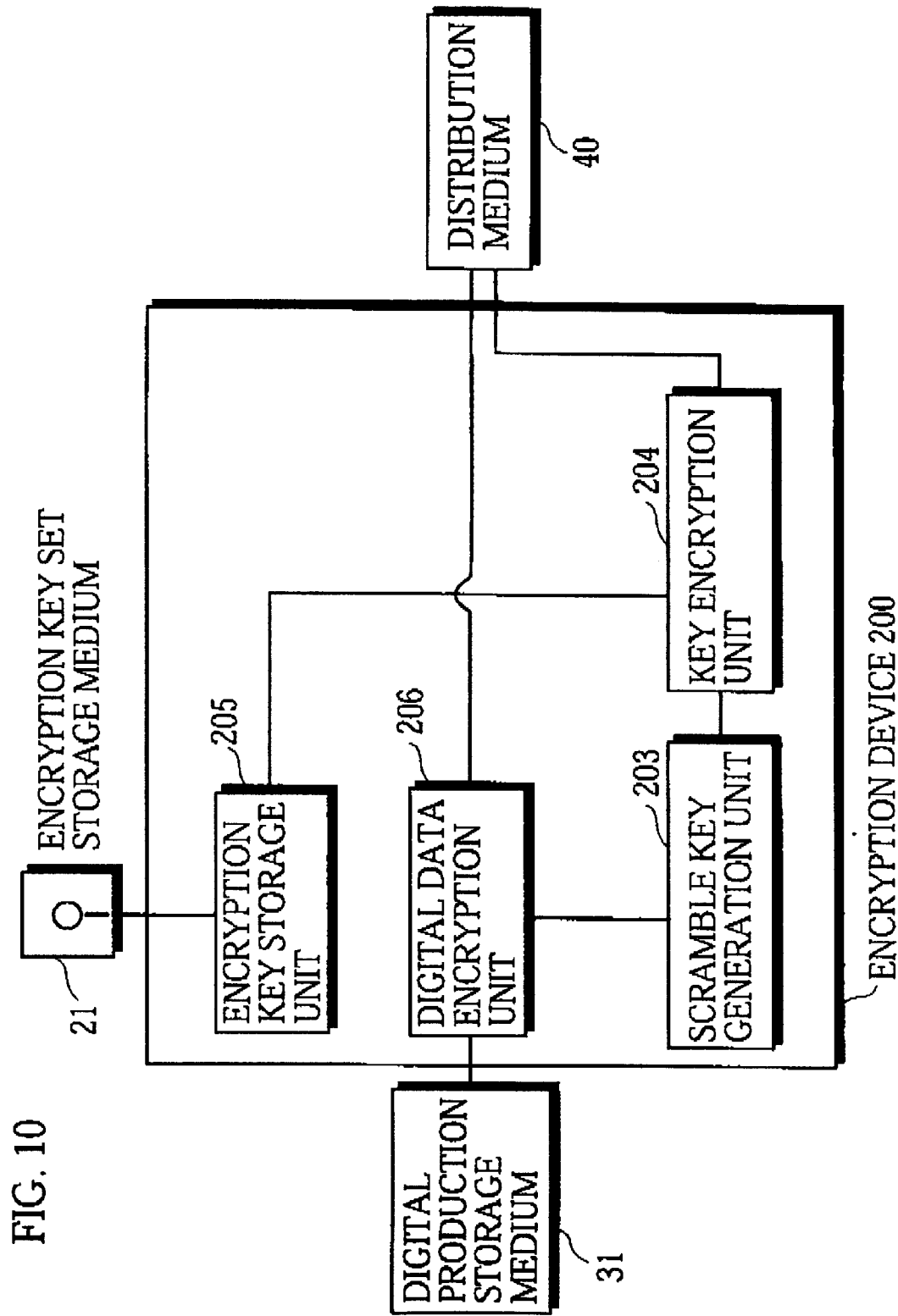
FIG. 10 is a block diagram showing the construction of the encryption device 200 in the encryption system 10 shown in FIG. 1.

As shown in FIG. 10, the encryption device 200 includes an encryption key storage unit 205, a digital data encryption unit 206, a scramble key generation unit 203, and a key encryption unit 204.

1.3.1. Encryption Key Storage Unit 205

The encryption key storage unit 205 reads the encryption key set 420 from the encryption key set storage medium 21 distributed from the key management device 100 and stores the encryption key set 420 which includes N encryption keys. Here, each encryption key has 128 bits.

1.3.2. Scramble Key Generation Unit 203

The scramble key generation unit 203 generates a scramble key (64 bits in the present embodiment) using a random number and combines 64 bits which are all "0" with the 64-bit scramble key. As a result, a 128-bit scramble key plaintext composed of the 64 bits that are all "0" and the 64-bit scramble key is generated and sent to the key encryption unit 204.

The scramble key generation unit 203 also sends the 64-bit scramble key to the digital data encryption unit 206.

1.3.3. Key Encryption Unit 204

Figure 11:
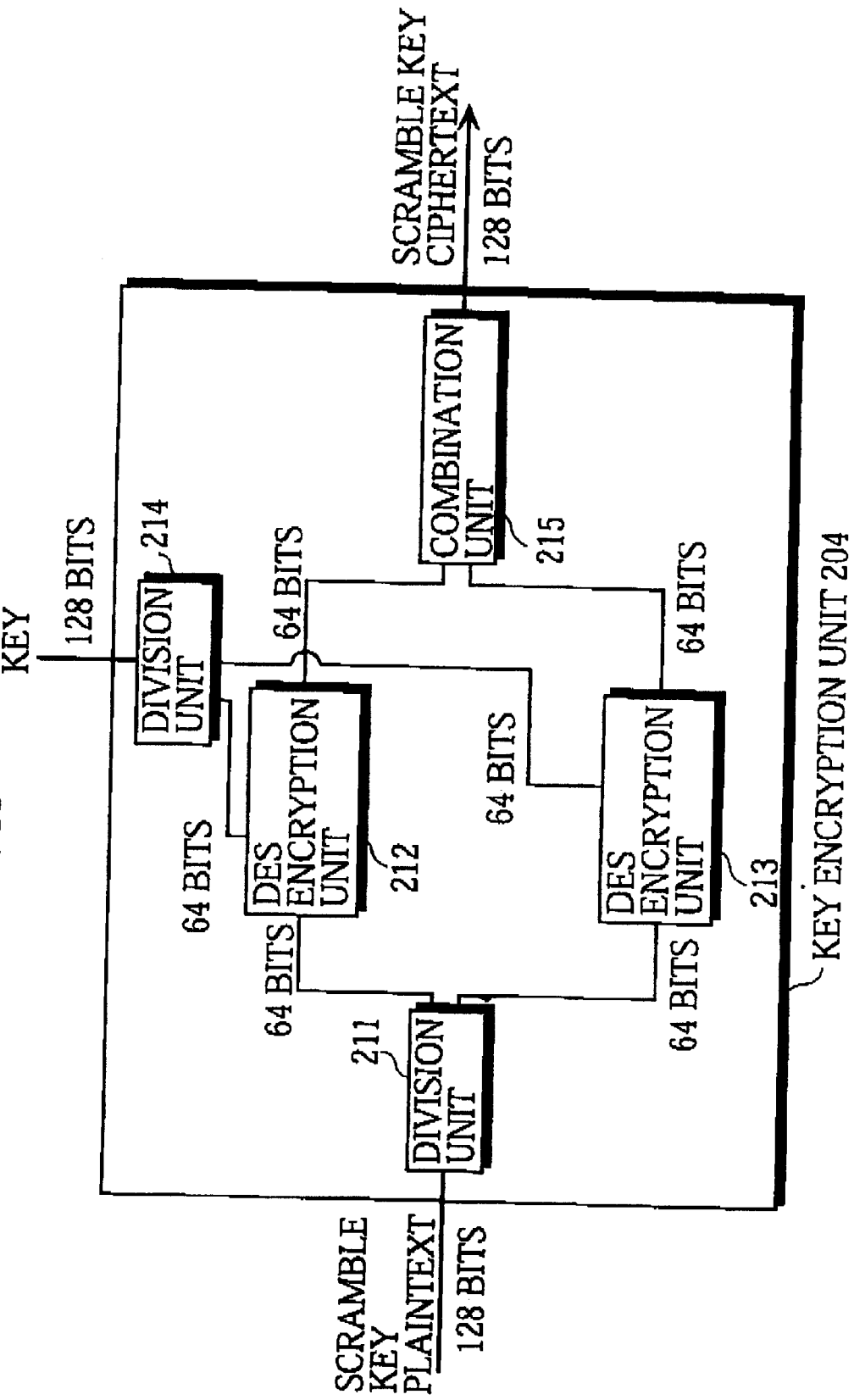
FIG. 11 is a block diagram showing the construction of the key encryption unit 204 in the encryption device 200 shown in FIG. 10.

As shown in FIG. 11, the key encryption unit 204 includes division units 211 and 214, DES encryption units 212 and 213, and a combination unit 215.

(1) Division Unit 211

The division unit 211 divides the scramble key plaintext sent from the scramble key generation unit 203 into the 64 bits that are all "0" and the 64-bit scramble key, which are then respectively sent to the DES encryption units 212 and 213.

(2) Division Unit 214

The division unit 214 successively receives the N encryption keys from the encryption key storage unit 205 and divides each 128-bit encryption key into the first 64 bits and the second 64 bits, which are then respectively sent to the DES encryption units 212 and 213.

(3) DES Encryption Unit 212

The DES encryption unit 212 encrypts the 64 bits which are all "0" using the 64-bit key sent from the division unit 214 to generate a 64-bit ciphertext in accordance with the DES algorithm taught by the Data Encryption Standard (DES). Since the DES algorithm is a well known technique, it is not explained here. The generated 64-bit ciphertext is sent to the combination unit 215.

(4) DES Encryption Unit 123

The DES encryption unit 213 encrypts the 64-bit scramble key using the 64-bit key sent from the division unit 214 to generate a 64-bit ciphertext according to the DES algorithm, The generated 64-bit ciphertext is sent to the combination unit 215.

(5) Combination Unit 215

The combination unit 215 combines the 64-bit ciphertext sent from the DES encryption unit 212 and the 64-bit ciphertext sent from the DES encryption unit 213 to generate a 128-bit ciphertext, that is, a scramble key ciphertext, and writes the scramble key ciphertext into the distribution medium 40. After the above encryption is repeated N times, N 128-bit scramble key ciphertexts are written into the distribution device 40.

1.3.4. Digital Data Encryption Unit 206

The digital data encryption unit 206 reads a digital production from the digital production storage medium 31 and encrypts it using the 64-bit scramble key sent from the scramble key generation unit 203 according to the DES algorithm. As a result, an encrypted digital production is generated and written into the distribution device 40.

Figure 12:
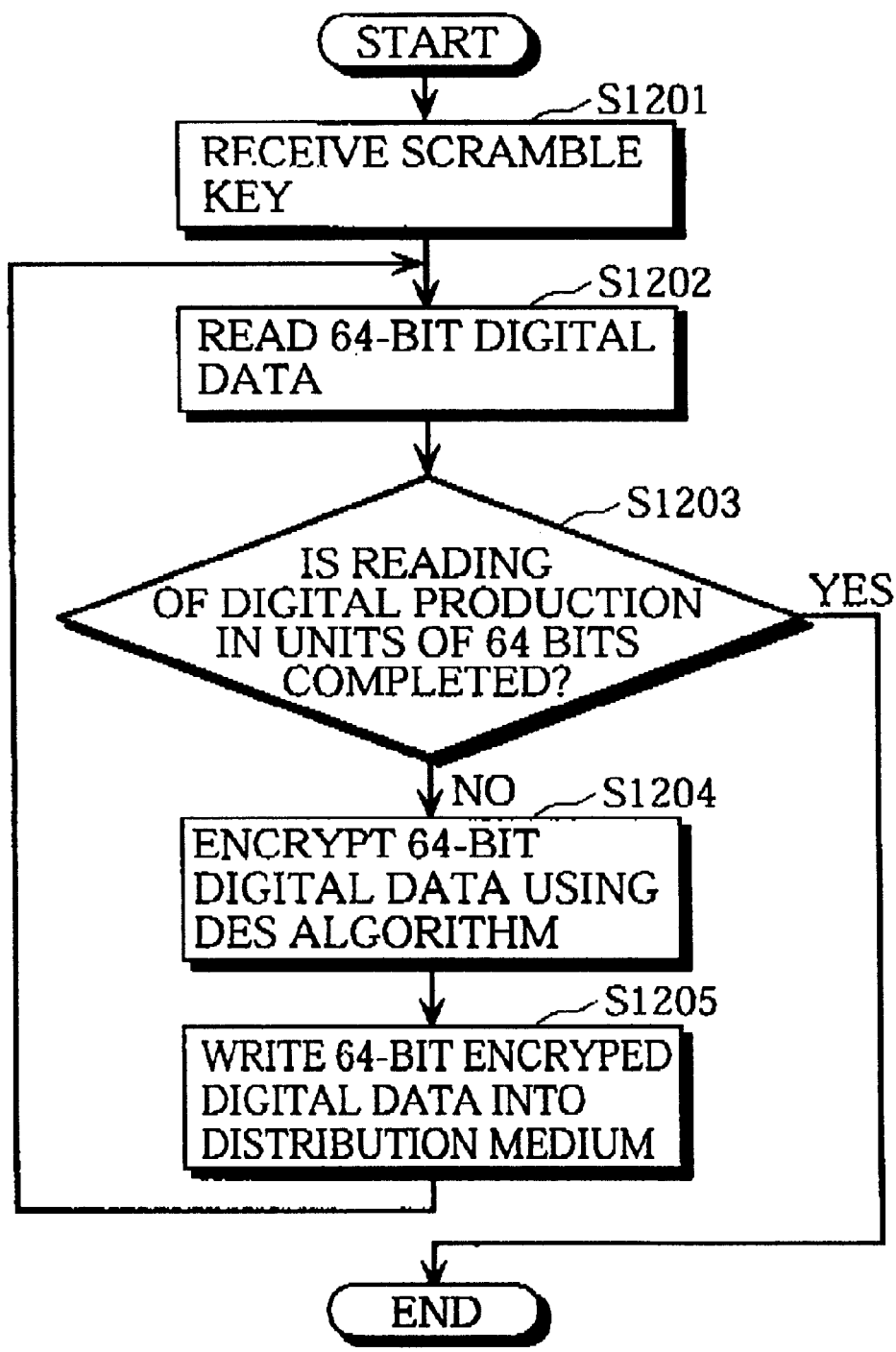
FIG. 12 is a flowchart showing the operation of the digital data encryption unit 206 in the encryption device 200.

The operation of the digital data encryption unit 206 is explained below with reference to FIG. 12.

The digital data encryption unit 206 receives the 64-bit scramble key from the scramble key generation unit 203 (Step S1201) and reads 64-bit digital data from the digital production stored in the digital production storage medium 31 (Step S1202). If there is no digital data left in the digital production storage medium 31 (step S1203), the operation is completed. If, on the other hand, there is still digital data left in the digital production storage medium 31 (Step S1203), the digital data encryption unit 206 reads 64-bit digital data and encrypts it using the 64-bit scramble key according to the DES algorithm to generate 64-bit encrypted digital data (Step S1204), which is then written into the distribution medium 40 (Step S1205). Next, the operation returns to Step S1202 and the reading of 64-bit digital data, the encryption of the 64-bit digital data, and the writing of encrypted digital data into the distribution medium 40 is repeated until the digital data encryption unit 206 completes the reading of the digital production in units of 64 bits from the digital production storage medium 31.

1.4. Operation of Encryption Device 200

Figure 13:
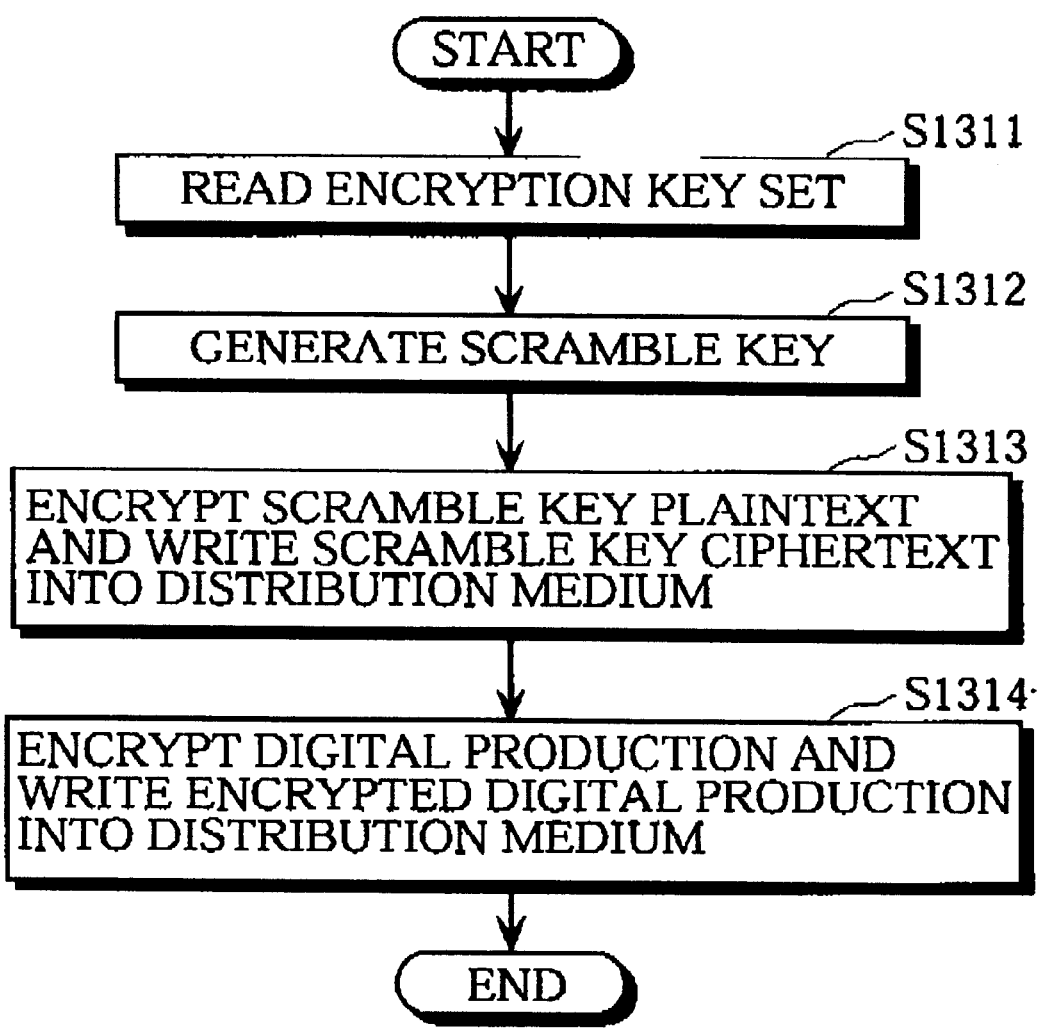
FIG. 13 is a flowchart showing the operation of the encryption device 200.

The following is an explanation of the operation of the encryption device 200 with reference to FIG. 13. Note that the encryption devices 201–202 operate in the same way as the encryption device 200 and thus are not explained here.

The encryption key storage unit 205 reads the encryption key set 420 from the encryption key set storage medium 21 distributed from the key management device 100 and stores the encryption key set 420 which includes the N encryption keys (Step S1311).

The scramble key generation unit 203 generates a 64-bit scramble key using a random number and combines 64 bits which are all "0" and the 64-bit scramble key to generate a 128-bit scramble key plaintext. The 128-bit scramble key plaintext is sent to the key encryption unit 204, while the 64-bit scramble key is sent to the digital data encryption unit 206 (Step S1312).

In the key encryption unit 204, the division unit 211 divides the 128-bit scramble key plaintext into the 64 bits that are all "0" and the 64-bit scramble key, which are then respectively sent to the DES encryption units 212 and 213. The division unit 214 successively reads the N encryption keys from the encryption key storage unit 205 and divides each encryption key into the first 64 bits and the second 64 bits, which are then respectively sent to the DES encryption units 212 and 213. The DES encryption unit 212 encrypts the 64 bits that are all "0" using the 64-bit key sent from the division unit 214 according to the DES algorithm to generate a 64-bit ciphertext, which is then sent to the combination unit 215. The DES encryption unit 213 encrypts the 64-bit scramble key using the 64-bit key sent from the division unit 214 according to the DES algorithm to generate a 64-bit ciphertext, which is then sent to the combination unit 215. The combination unit 215 combines the 64-bit ciphertext sent from the DES encryption unit 212 and the 64-bit ciphertext sent from the DES encryption unit 213 to generate a 128-bit scramble key ciphertext. The combination unit 215 then writes the 128-bit scramble key ciphertext into the distribution medium 40. As a result, N scramble key ciphertexts are written into the distribution medium 40 (Step S1313).

The digital data encryption unit 206 reads the digital production from the digital production storage medium 31 and encrypts the digital production in units of 64 bits using the 64-bit scramble key according to the DES algorithm. As a result, an encrypted digital production is generated and written into the distribution medium 40 (Step S1314).

Figure 14:
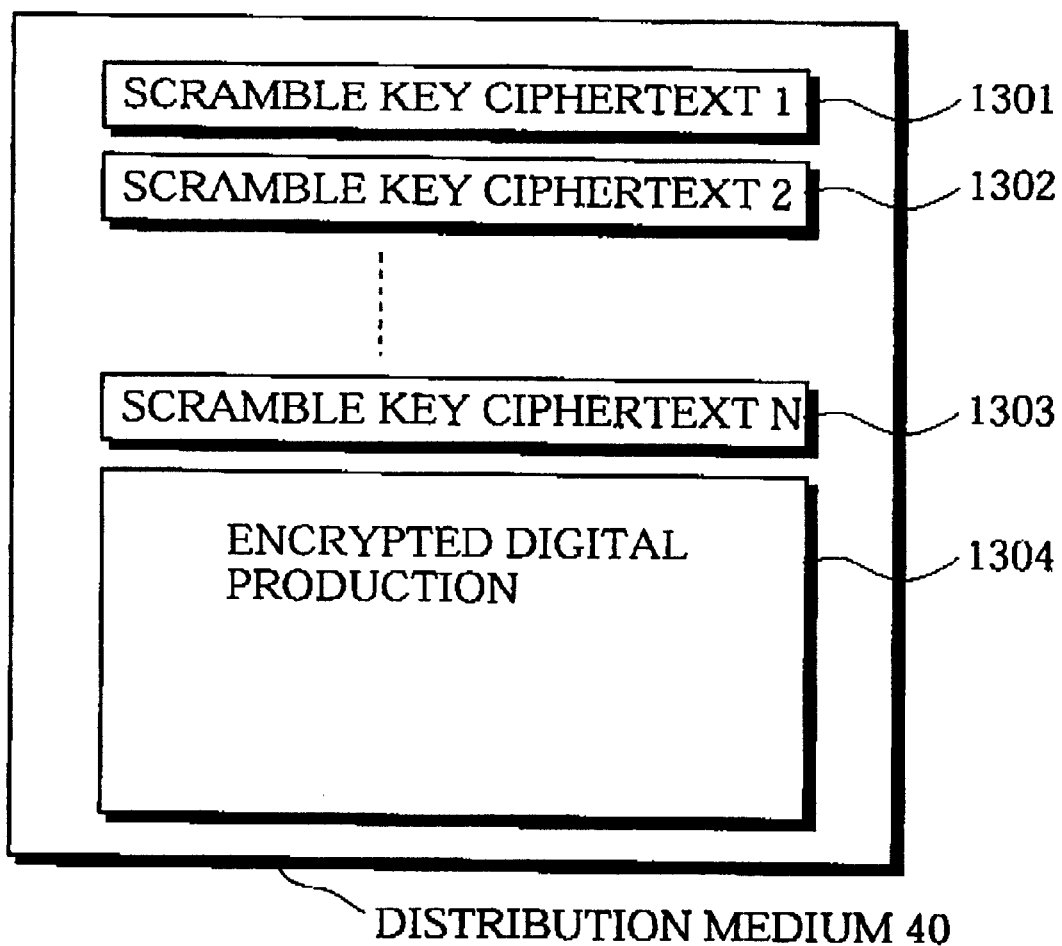
FIG. 14 shows the construction of the distribution medium 40.

Consequently, the N scramble key ciphertexts 1301, 1302, . . . , 1303 and the encrypted digital production 1304 are written in the distribution device 40, as shown in FIG. 14.

1.5. Construction of Decryption Device 300

The following is an explanation of the construction of the decryption device 300. Note that the decryption devices 301–302 are constructed in the same way as the decryption device 300 and thus are not explained here.

Figure 15:
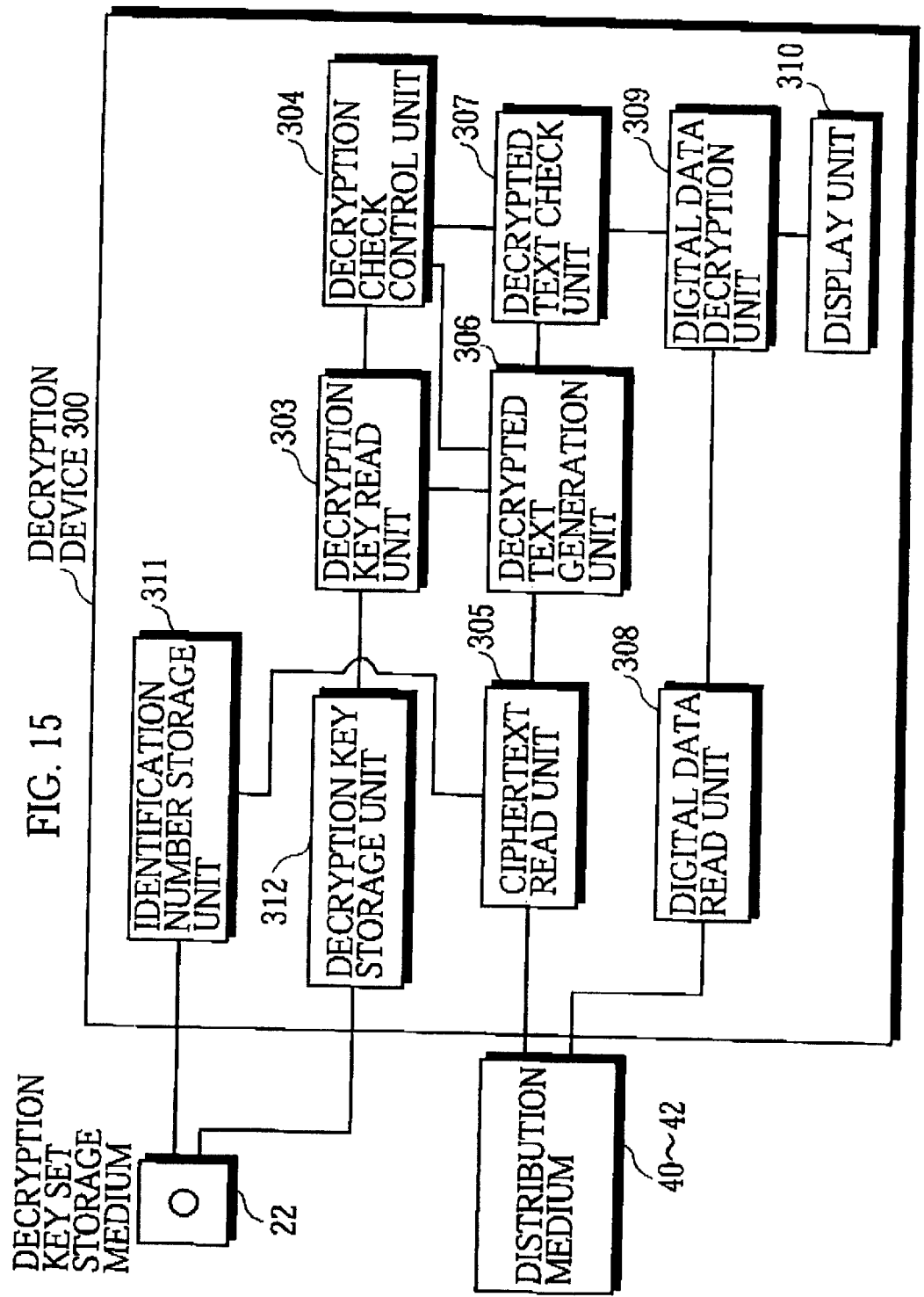
FIG. 15 is a block diagram showing the construction of the decryption device 300 in the encryption system 10 shown in FIG. 1.

As shown in FIG. 15, the decryption device 300 includes an identification number storage unit 311, a decryption key storage unit 312, a decryption key read unit 303, a decryption check control unit 304, a ciphertext read unit 305, a decrypted text generation unit 306, a decrypted text check unit 307, a digital data read unit 308, a digital data decryption unit 309, and a display unit 310.

1.5.1. Identification Number Storage Unit 311

The identification number storage unit 311 reads an identification number corresponding to the decryption device 300 from the decryption key set storage medium 22 and stores the identification number.

1.5.2. Decryption Key Storage Unit 312

The decryption key storage unit 312 reads the decryption key set 400 from the decryption key set storage medium 22 and stores the decryption key set 400 which includes R decryption keys.

1.5.3. Ciphertext Read Unit 305

The ciphertext read unit 305 reads the identification number stored in the identification number storage unit 311 and reads a scramble key ciphertext identified by the identification number from one of the distribution mediums 40–42. The ciphertext read unit 305 then sends the scramble key ciphertext to the decrypted text generation unit 306.

1.5.4. Decryption Check Control Unit 304

The decryption check control unit 304 controls the decryption key read unit 303, the decrypted text generation unit 306, and the decrypted text check unit 307 to repeat an operation R times until the R decryption keys are all read from the decryption key set 400. In the operation, the decryption key read unit 303 reads a decryption key, the decrypted text generation unit 306 decrypts the scramble key ciphertext, and the decrypted text check unit 307 checks a scramble key decrypted text generated by the decrypted text generation unit 306.

More specifically, the decryption check control unit 304 controls the decryption key read unit 303 to read a first decryption key from the decryption key set 400. The decryption check control unit 304 then controls the decrypted text generation unit 306 to decrypt the scramble key ciphertext using the first decryption key to generate a scramble key decrypted text. The decryption check control unit 304 next controls the decrypted text check unit 307 to check whether the scramble key decrypted text is the correct decrypted text according to the predetermined criterion.

The decryption check control unit 304 repeats the same control for second to Rth decryption keys in the decryption key set 400.

As a result, the correct scramble key decrypted text that includes an original scramble key is obtained.

1.5.5. Decryption Key Read Unit 303

The decryption key read unit 303 reads a decryption key specified of the decryption check control unit 304 from the decryption key set 400 stored in the decryption key storage unit 312 and sends the read decryption key to the decrypted text generation unit 306.

1.5.6. Decrypted Text Generation Unit

Figure 16:
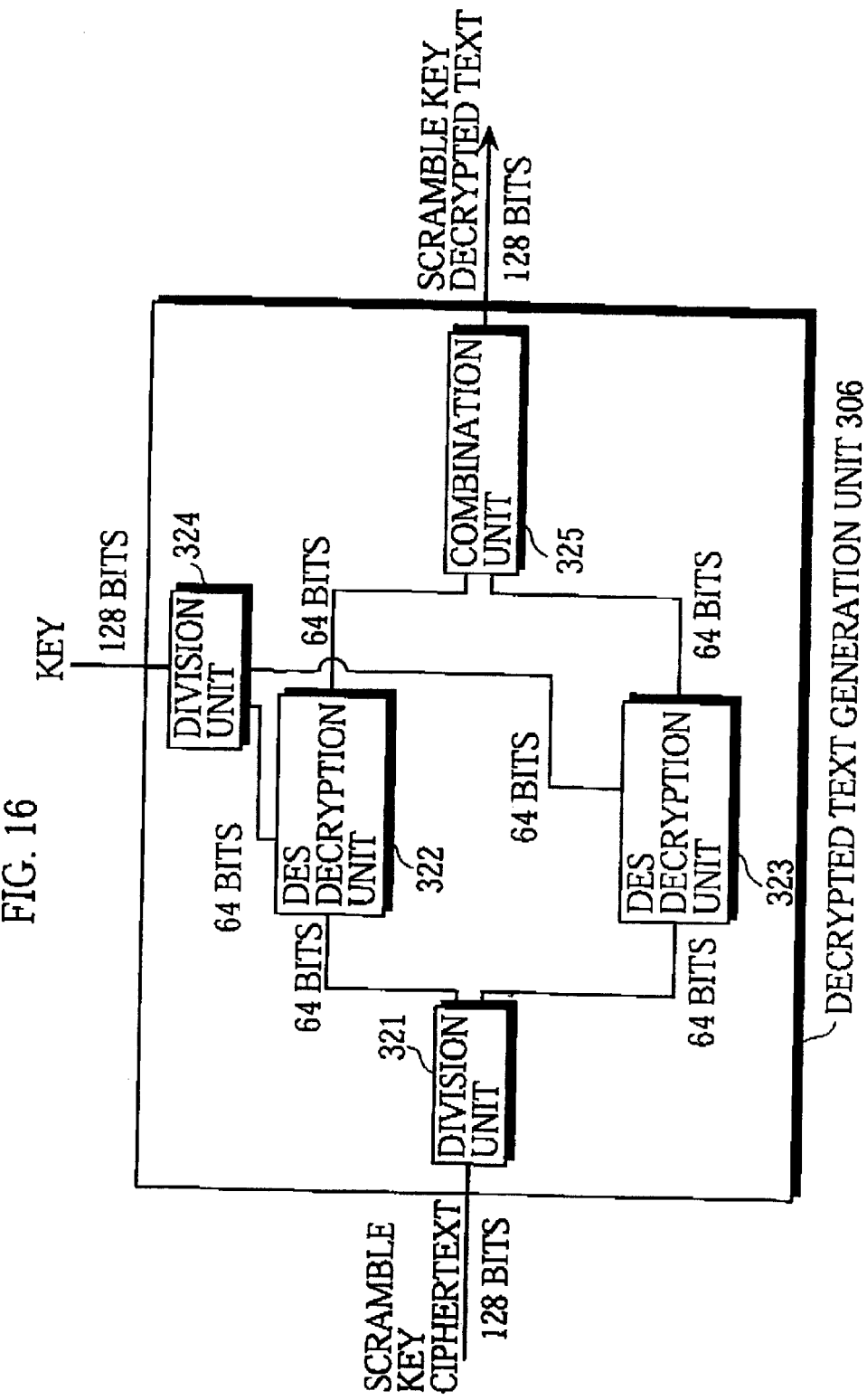
FIG. 16 is a block diagram showing the construction of the decrypted text generation unit 306 in the decryption device 300 shown in FIG. 15.

The decrypted text generation unit 306 includes division units 321 and 324, DES decryption units 322 and 323, and a combination unit 325 as shown in FIG. 16, and operates according to the control by the decryption check control unit 304.

(1) Division Unit 321

The division unit 321 receives the 128-bit scramble key ciphertext from the ciphertext read unit 305 and divides it into the first 64 bits and the second 64 bits, which are respectively sent to the DES decryption units 322 and 323.

(2) Division Unit 324

The division unit 324 receives the 128-bit decryption key from the decryption key read unit 303 and divides the decryption key into the first 64 bits and the second 64 bits, which are then respectively sent to the DES decryption units 322 and 323.

(3) DES Decryption Unit 322

The DES decryption unit 322 decrypts the 64-bit data sent from the division unit 321 using the 64-bit key sent from the division unit 324 according to the DES algorithm to generate a 64-bit decrypted text, which is then sent to the combination unit 325.

(4) DES Decryption Unit 323

The DES decryption unit 323 decrypts the 64-bit data sent from the division unit 321 using the 64-bit key sent from the division unit 324 according to the DES algorithm to generate a 64-bit decrypted text, which is then sent to the combination unit 325 .

(5) Combination Unit 325

The combination unit 325 combines the 64-bit decrypted text sent from the DES decryption unit 322 and the 64-bit decrypted text sent from the DES decryption unit 323 to generate a 128-bit scramble key decrypted text and sends the scramble key decrypted text to the decrypted text check unit 307.

1.5.7 Decrypted Text Check Unit 307

The decrypted text check unit 307 checks, in accordance with the control by the decryption check control unit 304, the scramble key decrypted text generated by the decrypted text generation unit 306 to judge whether it is the correct decrypted text according to the predetermined criterion.

More specifically, if the first 64 bits of the scramble key decrypted text generated using the decryption key read by the decryption key read unit 303 are all "0", the decrypted text check unit 307 judges that the scramble key decrypted text is the correct decrypted text. If, on the other hand, the first 64 bits of the scramble key decrypted text are not all "0", the decrypted text check unit 307 judges that the scramble key decrypted text is not the correct decrypted text.

When the scramble key decrypted text is judged to be correct, the decrypted text check unit 307 sends the scramble key composed or the second 64 bits of the scramble key decrypted text to the digital data decryption unit 309.

1.5.8. Digital Data Read Unit 308

The digital data read unit 308 reads an encrypted digital production stored in the distribution medium and sends the encrypted digital production to the digital data decryption unit 309.

1.5.9. Digital Data Decryption Unit 309

The digital data decryption unit 309 decrypts the encrypted digital production sent from the digital data read unit 308 using the scramble key sent from the decrypted text check unit 307 according to the DES algorithm. As a result, the original digital production is obtained and sent to the display unit 310.

Figure 17:
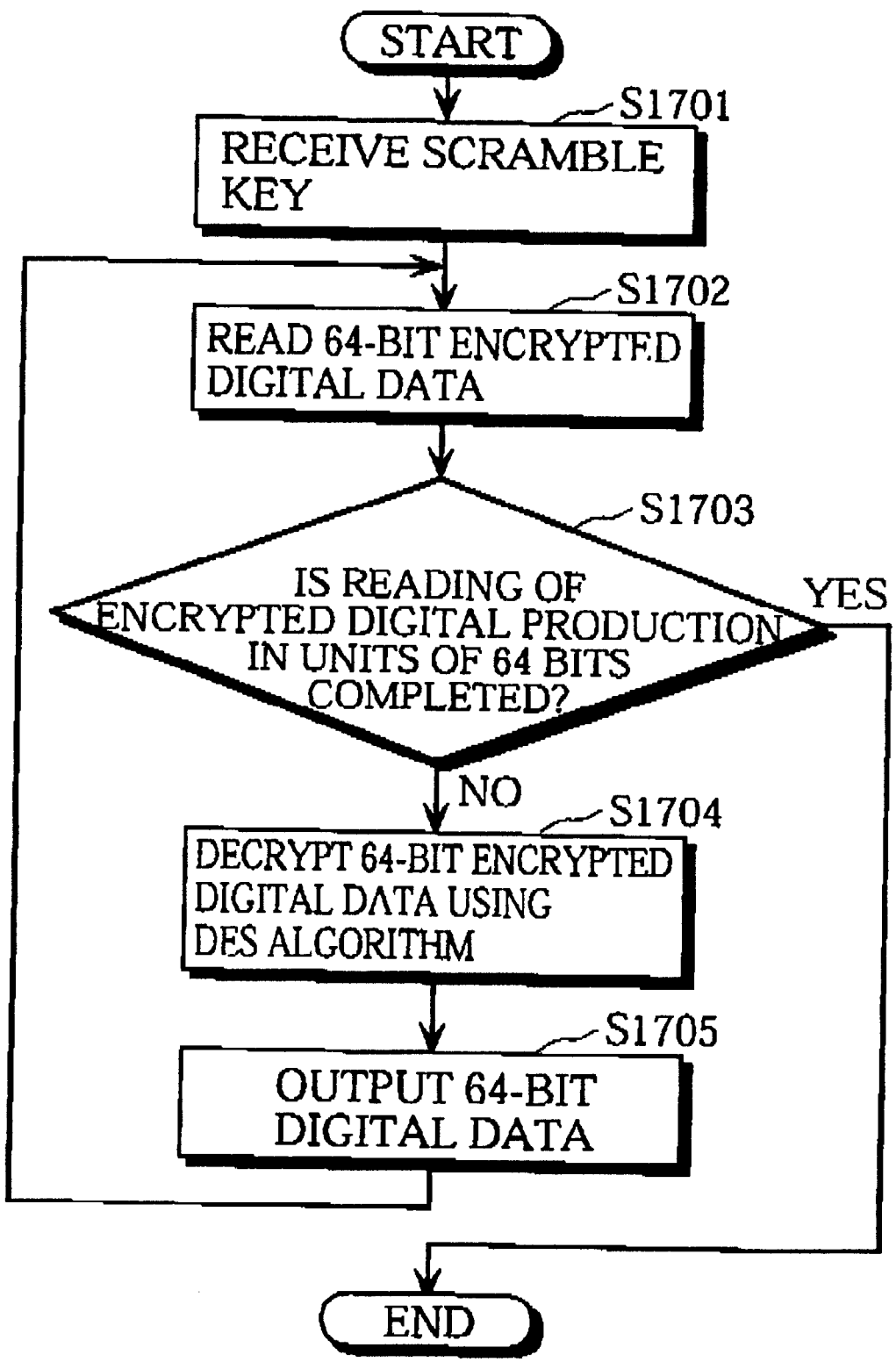
FIG. 17 is a flowchart showing the operation of the digital data decryption unit 309 in the decryption device 300.

The operation of the digital data decryption unit 309 is explained below with reference to FIG. 17.

The digital data decryption unit 309 receives the 64-bit scramble key from the decrypted text check unit 307 (Step S1701) and reads 64-bit encrypted digital data from the encrypted digital production in the digital data read unit 308 (Step S1702). If there is no encrypted digital data left in the digital data read unit 308 (Step S1703), the operation is completed. If, on the other hand, there is still encrypted digital data left in the digital data read unit 308 (Step S1703), the digital data decryption unit 309 reads 64-bit encrypted digital data and decrypts it using the 64-bit scramble key according to the DES algorithm to obtain 64-bit digital data (Step S1704). The generated 64-bit digital data is sent to the display unit 310 (Step S1705). The operation then returns to Step S1702 and the reading of 64-bit encrypted digital data, the decryption of the 64-bit encrypted digital data, and the sending of the obtained digital data to the display unit 310 is repeated until the digital data decryption unit 309 completes the reading of the encrypted digital production in units of 64 bits from the digital data read unit 308.

1.5.10. Display Unit 310

The display unit 310 successively displays the 64-bit digital data sent from the digital data decryption unit 309.

1.6. Operation of Decryption Device 300

The following is an explanation of the operation of the decryption device 300 with reference to FIG. 18. Note that the decryption devices 301–302 operate in the same way as the decryption device 300 and thus are not explained here.

The identification number storage unit 311 reads the identification number corresponding to the decryption device 300 from the decryption key set storage medium 22 and stores the identification number (Step S1801).

The decryption key storage unit 312 reads the decryption key set 400 from the decryption key set storage medium 22 and stores the decryption key set 400 which includes the R decryption keys (Step S1802).

The ciphertext read unit 305 reads the identification number stored in the identification number storage unit 311 and reads a scramble key ciphertext identified by the identification number from the distribution medium. The ciphertext read unit 305 then sends the scramble key ciphertext to the decrypted text generation unit 306 (Step S1803).

The decryption check control unit 304 controls the decryption key read unit 303, the decrypted text generation unit 306, and the decrypted text check unit 307 to repeat an operation R times until the R decryption keys are all read from the decryption key set 400, with an integer counter r being incremented from 1 to R by 1 (Steps S1804–S1810). In the operation, the decryption key read unit 303 reads a decryption key from the R decryption keys (Step S1805), the decrypted text generation unit 306 decrypts the scramble key ciphertext (Step S1806), and the decrypted text check unit 307 checks a scramble key decrypted text generated by the decrypted text generation unit 306 (Steps S1807–S1809). After the above operation is repeated R times, the correct scramble key decrypted text is obtained. Accordingly, the scramble key included in the correct scramble key decrypted text is sent from the decrypted text check unit 307 to the digital data decryption unit 309.

The digital data read unit 308 reads the encrypted digital production from the distribution medium, and the digital data decryption unit 309 decrypts the encrypted digital production in units of 64 bits using the scramble key according to the DES algorithm. As a result, the original digital production is obtained and sent to the display unit 310 (Step S1811). The display unit 310 displays the digital production sent from the digital data decryption unit 309 in units of 64 bits (Step S1812).

2. Other Embodiments

Note that the present invention is not limited to the above embodiment. The following modifications are included in the present invention.

(1) In the above embodiment, the correct decryption key is selected by encrypting a scramble key plaintext where 64 bits which are all "0" are attached in front of a 64-bit scramble key and judging whether the first 64 bits are all "0" when decrypting a scramble key ciphertext. However, the present invention is not limited to such. The encryption device may encrypt a set of fixed information to generate N sets of encrypted fixed information after encrypting the 64-bit scramble key. By doing so, the decryption device decrypts a set of encrypted fixed information identified by its identification number and judges whether the obtained decrypted text matches the original set of fixed information, while the key management device decrypts the N sets of encrypted fixed information and judges whether each obtained decrypted text matches the original set of fixed information.

(2) In the above embodiment, the encryption key generation unit 113 randomly selects a key from R decryption keys included in each decryption key set in the decryption key table 112 and writes the selected key into an encryption key set in the encryption key table 114. However, the encryption key generation S unit 113 may instead randomly and uniformly select a key from the R decryption keys included in each decryption key set, the selected key then being written into the encryption key set in the encryption key table 114. Here, to select a key k randomly and uniformly means to select the key k randomly so as to satisfy the formula "f(k)=predetermined value", wherein f is a probability density function and k is a random variable that changes within a specified range.

(3) In the above embodiment, the key management device 100 distributes the encryption key set storage mediums 21 and the decryption key set storage mediums 22 respectively to the encryption devices 200–202 and the decryption devices 300–302. However, the key management device 100 may instead be connected to each encryption device via a communication line, so that the it can distribute information stored in each encryption key set storage medium 21 to a corresponding encryption device via the communication line. In the same way, the key management device 100 may be connected to each decryption device via a communication line, so that it can distribute information stored in each decryption key set storage medium 22 to a corresponding decryption device via the communication line.

(4) while the DES algorithm is used in the above embodiment, other encryption algorithms may instead be used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An encryption system comprising a key management device, encryption devices of M types, and decryption devices of N types, wherein M and N are both integers that are no less than 2, the encryption system comprising:

the key management device being disposed for storing M encryption key sets, N decryption key sets, and N identification numbers, distributing a different one of the M encryption key sets to all encryption devices of a same type out of the M types, distributing a different one of the N decryption key sets to all decryption devices of a same type out of the N types, and distributing a different one of the N identification numbers to all decryption devices of the same type out of the N types, wherein each encryption key set includes N encryption keys, and each decryption key set includes a predetermined number of decryption keys;

each encryption device being disposed for encrypting digital data using a scramble key to generate encrypted digital data, encrypting the scramble key using each of N encryption keys included in a distributed encryption key set to generate N encrypted scramble keys, and writing the encrypted digital data and the N encrypted scramble keys into a distribution medium; and each decryption device being disposed for decrypting an encrypted scramble key, which is identified by a distributed identification number, among the N encrypted scramble keys written in the distribution medium, using each of the predetermined number of decryption keys included in a distributed decryption key set, selecting a decryption key that correctly decrypts the encrypted scramble key according to a predetermined criterion, and decrypting the encrypted digital data written in the distribution medium using the scramble key obtained by correctly decrypting the encrypted scramble key to obtain the digital data, and wherein the key management device includes:

a first ciphertext read unit disposed for reading an encrypted scramble key from the distribution medium;

a decryption key set read unit disposed for reading a decryption key set from the N decryption key sets;

a decryption selection unit disposed for decrypting the read encrypted scramble key using each of the predetermined number of decryption keys included in the read decryption key set in order to select a decryption key, among the predetermined number of decryption keys, that correctly decrypts the encrypted scramble key according to the predetermined criterion;

a first repeat control unit disposed for controlling the first ciphertext read unit, the decryption key set read unit, and the decryption selection unit in order to respectively repeat an encrypted scramble key reading, a decryption key set reading, and an encrypted scramble key decryption, until the N encrypted scramble keys are read from the distribution medium, wherein N decryption keys are selected as a result of a control by the first repeat control unit; and a key pattern detection unit disposed for detecting an encryption key set, among the M encryption key sets, that matches the selected N decryption keys and identifying an encryption device type, among the M types, specified by the detected encryption key set.

2. The encryption system of claim 1, wherein the key management device includes:

a decryption key storage unit disposed for storing the N decryption key sets that each include the predetermined number of decryption keys;

an encryption key generation unit disposed for generating an encryption key set which includes N encryption keys by selecting a decryption key, from each decryption key set stored in the first decryption key storage unit, as an encryption key according to a first predetermined method;

a first encryption key storage unit disposed for storing the generated encryption key set;

a second repeat control unit disposed for controlling the encryption key generation unit in order to repeat an encryption key set generation until the M encryption key sets are generated, wherein the first encryption key storage unit stores the generated M encryption key sets;

an encryption key set distribution unit disposed for distributing a different one of the M encryption key sets stored in the first encryption key storage unit to all encryption devices of the same type out of the M types;

a decryption key set distribution unit disposed for distributing a different one of the N decryption key sets stored in the first decryption key storage unit to all decryption devices of the same type out of the N types; and an identification number distribution unit disposed for distributing a different one of the N identification numbers to all decryption devices of the same type out of the N types.

3. The encryption system of claim 2, wherein the first predetermined method is to randomly select the decryption key from each decryption key set stored in the first decryption key storage unit.

4. The encryption system of claim 2, wherein the first predetermined method is to randomly and uniformly select the decryption key from each decryption key set stored in the first decryption key storage unit, wherein each stored decryption key set has an equal chance of being selected.

5. The encryption system of claim 1, wherein each encryption device includes:

an encryption key storage unit disposed for storing the encryption key set distributed from the key management device, the encryption key set including the N encryption keys;

a scramble key generation unit disposed for generating the scramble key;

a digital data encryption unit disposed for receiving the digital data from outside and encrypting the digital data using the scramble key to generate the encrypted digital data;

a key encryption unit disposed for encrypting, according to a second predetermined method, the scramble key using each of the N encryption keys included in the encryption key set in the encryption key storage unit in order to generate the N encrypted scramble keys; and a medium write unit disposed for writing the encrypted digital data and the N encrypted scramble keys into the distribution medium.

6. The encryption system of claim 5, wherein the second predetermined method is to combine the scramble key with a set of fixed information and encrypt a combination of the scramble key and the set of fixed information.

7. The encryption system of claim 5, wherein the second predetermined method is to encrypt the scramble key and a set of fixed information to respectively generate the N encrypted scramble keys and N sets of encrypted fixed information, and wherein the medium write unit writes the encrypted digital data, the N encrypted scramble keys, and the N sets of encrypted fixed information into the distribution medium.

8. The encryption system of claim 1, wherein the decryption selection unit in the key management device includes:

a first decryption key read unit disposed for reading a decryption key from the decryption key set read by the decryption key set read unit;

a first decrypted text generation unit disposed for decrypting the encrypted scramble key read by the first ciphertext read unit using the read decryption key to generate a decrypted text;

a first decrypted text check unit for checking whether the decrypted text obtained using the read decryption key is a correct decrypted text according to the predetermined criterion;

a second repeat control unit disposed for controlling the first decryption key read unit, the first decrypted text generation unit, and the first decrypted text check unit to respectively repeat a decryption key reading, an encrypted scramble key decryption, and a decrypted text checking until the predetermined number of decryption keys are read from the decryption key set; and a key output unit disposed for outputting the decryption key that correctly decrypts the encrypted scramble key.

9. The encryption system of claim 8,
wherein the predetermined criterion is that the decrypted text includes a set of fixed information.

10. The encryption system of claim 8,
wherein the distribution medium includes N sets of encrypted fixed information obtained by encrypting a set of fixed information using each of the N encryption keys included in the encryption key set,
wherein the key management device further includes:
an encrypted fixed information read unit disposed for reading the N sets of encrypted fixed information; and
an encrypted fixed information decryption unit disposed for decrypting the N sets of encrypted fixed information respectively using the N decryption key sets, and
wherein the predetermined criterion is that the set of fixed information is obtained as a result of decrypting each of the N sets of encrypted fixed information.

11. The encryption system of claim 1,
wherein each decryption device includes:
an identification number storage unit disposed for storing the identification number distributed from the key management device;
a second decryption key storage unit disposed for storing the decryption key set distributed from the key management device, the decryption key set including the predetermined number of decryption keys;
a second ciphertext read unit disposed for reading the encrypted scramble key identified by the identification number from the distribution medium;
a digital data read unit disposed for reading the encrypted digital data from the distribution medium;
a second decryption key read unit disposed for reading a decryption key from the decryption key set stored in the second decryption key storage unit;
a second decrypted text generation unit disposed for decrypting the read encrypted scramble key using the read decryption key to generate a decrypted text;
a second decrypted text check unit disposed for checking whether the decrypted text is a correct decrypted text according to the predetermined criterion,
wherein the correct decrypted text includes the scramble key;
a second repeat control unit disposed for controlling the second decryption key read unit, the second decrypted text generation unit, and the second decrypted text check unit to respectively repeat a decryption key reading, an encrypted scramble key decryption, and a decrypted text checking until the predetermined number of decryption keys are read from the decryption key set; and
a digital data decryption unit disposed for decrypting the encrypted digital data using the obtained scramble key to obtain the digital data.

12. The encryption system of claim 11,
wherein the predetermined criterion is that the decrypted text includes a set of fixed information.

13. The encryption system of claim 11,
wherein the distribution medium includes N sets of encrypted fixed information obtained by encrypting a set of fixed information using each of the N encryption keys included in the encryption key set,
wherein each decryption device further includes:
an encrypted fixed information read unit disposed for reading a set of encrypted fixed information, among the N sets of encrypted fixed information, that is identified by the identification number; and
an encrypted fixed information decryption unit disposed for decrypting the set of encrypted fixed information using each of the predetermined number of decryption keys in the decryption key set, and
wherein the predetermined criterion is that the set of fixed information is obtained as a result of decrypting the set of encrypted fixed information.

14. The encryption system of claim 1,
wherein each encryption device includes:
a second encryption key storage unit disposed for storing the encryption key set distributed from the key management device, the encryption key set including the N encryption keys;
scramble key generation unit for generating the scramble key,
a digital data encryption unit disposed for receiving the digital data from outside and encrypting the digital data using the scramble key to generate the encrypted digital data;
a key encryption unit disposed for encrypting, according to a second predetermined method, the scramble key using each of the N encryption keys included in the encryption key set in the second encryption key storage unit in order to generate the N encrypted scramble keys; and
a medium write unit disposed for writing the encrypted digital data and the N encrypted scramble keys into the distribution medium, and
wherein the decryption selection unit in the key management device includes:
a first decryption key read unit disposed for reading a decryption key from the decryption key set read by the decryption key set read unit;
a first decrypted text generation unit disposed for decrypting the encrypted scramble key read by the first ciphertext read unit using the read decryption key to generate a decrypted text;
a first decrypted text check unit disposed for checking whether the decrypted text obtained using the read decryption key is a correct decrypted text according to the predetermined criterion;
a second repeat control unit disposed for controlling the first decryption key read unit, the first decrypted text generation unit, and the first decrypted text check unit to respectively repeat a decryption key reading, an encrypted scramble key decryption, and a decrypted text checking until the predetermined number of decryption keys are read from the decryption key set; and
a key output unit disposed for outputting the decryption key that correctly decrypts the encrypted scramble key.

15. The encryption system of claim 14,
wherein the second predetermined method is to combine the scramble key with a set of fixed information and encrypt a combination of the scramble key and the set of fixed information, and
wherein the predetermined criterion is that the decrypted text includes the set of fixed information.

16. The encryption system of claim 14, wherein the second predetermined method is to encrypt the scramble key and a set of fixed information to respectively generate the N encrypted scramble keys and N sets of encrypted fixed information, wherein the medium write unit writes the encrypted digital data, the N encrypted scramble keys, and the N sets of encrypted fixed information into the distribution medium, wherein the key management device further includes:

an encrypted fixed information read unit disposed for reading the N sets of encrypted fixed information; and an encrypted fixed information decryption unit disposed for decrypting the N sets of encrypted fixed information respectively using the N decryption key sets, and wherein the predetermined criterion is that the set of fixed information is obtained as a result of decrypting each of the N sets of encrypted fixed information.

17. The encryption system of claim 1, wherein each encryption device includes:

a second encryption key storage unit disposed for storing the encryption key set distributed from the key management device, the encryption key set including the N encryption keys;

a scramble key generation unit disposed for generating the scramble key;

a digital data encryption unit disposed for receiving the digital data from outside and encrypting the digital data using the scramble key to generate the encrypted digital data;

a key encryption unit disposed for encrypting, according to a second predetermined method, the scramble key using each of the N encryption keys included in the encryption key set in the second encryption key storage unit in order to generate the N encrypted scramble keys; and a medium write unit disposed for writing the encrypted digital data and the N encrypted scramble keys into the distribution medium, and wherein each decryption device includes:

an identification number storage unit disposed for storing the identification number distributed from the key management device;

a second decryption key storage unit disposed for storing the decryption key set distributed from the key management device, the decryption key set including the predetermined number of decryption keys;

a second ciphertext read unit disposed for reading the encrypted scramble key identified by the identification number from the distribution medium;

a digital data read unit disposed for reading the encrypted digital data from the distribution medium;

a second decryption key read unit disposed for reading a decryption key from the decryption key set stored in the second decryption key storage unit;

a second decrypted text generation unit disposed for decrypting the read encrypted scramble key using the read decryption key to generate a decrypted text;

a second decrypted text check unit disposed for checking whether the decrypted text is a correct decrypted text according to the predetermined criterion, wherein the correct decrypted text includes the scramble key;

a second repeat control unit disposed for controlling the second decryption key read unit, the second decrypted text generation unit, and the second decrypted text check unit to respectively repeat a decryption key reading, an encrypted scramble key decryption, and a decrypted text checking until the predetermined number of decryption keys are read from the decryption key set; and a digital data decryption unit disposed for decrypting the encrypted digital data using the obtained scramble key to obtain the digital data.

18. The encryption system of claim 17, wherein the second predetermined method is to combine the scramble key with a set of fixed information and encrypt a combination of the scramble key and the set of fixed information, and wherein the predetermined criterion is that the decrypted text includes the set of fixed information.

19. The encryption system of claim 17, wherein the second predetermined method is to encrypt the scramble key and a set of fixed information to respectively generate the N encrypted scramble keys and N sets of encrypted fixed information, wherein the medium write unit writes the encrypted digital data, the N encrypted scramble keys, and the N sets of encrypted fixed information into the distribution medium, wherein each decryption device further includes:

an encrypted fixed information read unit disposed for reading a set of encrypted fixed information, among the N sets of encrypted fixed information, that is identified by the identification number; and an encrypted fixed information decryption unit disposed for decrypting the set of encrypted fixed information using each of the predetermined number of decryption keys in the decryption key set, and wherein the predetermined criterion is that the set of fixed information is obtained as a result of decrypting the set of encrypted fixed information.

20. The encryption system of claim 1, wherein the key management device includes:

a first decryption key storage unit disposed for storing the N decryption key sets which each include the predetermined number of decryption keys;

an encryption key generation unit disposed for generating an encryption key set which includes N encryption keys by selecting a decryption key, from each decryption key set stored in the first decryption key storage unit, as an encryption key according to a first predetermined method;

a first encryption key storage unit disposed for storing the generated encryption key set;

a second repeat control unit disposed for controlling the encryption key generation unit to repeat an encryption key set generation until the M encryption key sets are generated, wherein the first encryption key storage stores the generated M encryption key sets;

an encryption key set distribution unit disposed for distributing a different one of the M encryption key sets stored in the first encryption key storage unit to all encryption devices of the same type out of the M types;

a decryption key set distribution unit disposed for distributing a different one of the N decryption key sets stored in the first decryption key storage unit to all decryption devices of the same type out of the N types; and an identification number distribution unit disposed for distributing a different one of the N identification numbers to all decryption devices of the same type out of the N types, and wherein each decryption device includes:

an identification number storage unit disposed for storing the identification number distributed from the key management device;

a second decryption key storage unit disposed for storing the decryption key set distributed from the key management device, the decryption key set including the predetermined number of decryption keys;

a second ciphertext read unit disposed for reading the encrypted scramble key identified by the identification number from the distribution medium;

a digital data read unit disposed for reading the encrypted digital data from the distribution medium;

a second decryption key read unit disposed for reading a decryption key from the decryption key set stored in the second decryption key storage unit;

a second decrypted text generation unit disposed for decrypting the read encrypted scramble key using the read decryption key to generate a decrypted text;

a second decrypted text check unit disposed for checking whether the decrypted text is a correct decrypted text according to the predetermined criterion, wherein the correct decrypted text includes the scramble key;

a second repeat control unit disposed for controlling the second decryption key read unit, the second decrypted text generation unit, and the second decrypted text check unit to respectively repeat a decryption key reading, an encrypted scramble key decryption, and a decrypted text checking until the predetermined number of decryption keys are read from the decryption key set; and a digital data decryption unit disposed for decrypting the encrypted digital data using the obtained scramble key to obtain the digital data.

21. The encryption system of claim 20, wherein the first predetermined method is to randomly select the decryption key from each decryption key set stored in the first decryption key storage unit.

22. The encryption system of claim 20, wherein the first predetermined method is to randomly and uniformly select the decryption key from each decryption key set stored in the first decryption key storage unit, wherein each stored decyption key set has an equal chance of being selected.

23. The encryption system of claim 20, wherein the predetermined criterion is that the decrypted text includes a set of fixed information.

24. The encryption system of claim 20, wherein the distribution medium includes N sets of encrypted fixed information obtained by encrypting a set of fixed information using each of the N encryption keys included in the encryption key set, wherein each decryption device further includes:

an encrypted fixed information read unit disposed for reading a set of encrypted fixed information, among the N sets of encrypted fixed information, that is identified by the identification number; and an encrypted fixed information decryption unit disposed for decrypting the N sets of encrypted fixed information using each of the predetermined number of decryption keys in the decryption key set, and wherein the predetermined criterion is that the set of fixed information is obtained as a result of decrypting the set of encrypted fixed information.

25. A key management device for distributing key information to encryption devices of M types and decryption devices of N types, wherein M and N are both integers that are no less than 2, the key management device comprising:

a decryption key storage unit disposed for storing N decryption key sets which each include a predetermined number of decryption keys;

an encryption key generation unit disposed for generating an encryption key set which includes N encryption keys by selecting a decryption key, from each decryption key set stored in the decryption key storage unit, as an encryption key according to a predetermined method;

an encryption key storage unit disposed for storing the generated encryption key set;

a repeat control unit disposed for controlling the encryption key generation unit to repeat an encryption key set generation until M encryption key sets are generated, wherein the encryption key storage unit stores the generated M encryption key sets;

an encryption key set distribution unit disposed for distributing a different one of the M encryption key sets stored in the encryption key storage unit to all encryption devices of a same type out of the M types;

a decryption key set distribution unit disposed for distributing a different one of the N decryption key sets stored in the decryption key storage unit to all decryption devices of a same type out of the N types; and an identification number distribution unit disposed for distributing a different one of N identification numbers to all decryption devices of the same type out of the N types.

26. The key management device of claim 25, wherein the predetermined method is to randomly select the decryption key from each decryption key set stored in the decryption key storage unit.

27. The key management device of claim 25, wherein the predetermined method is to randomly and uniformly select the decryption key from each decryption key set stored in the decryption key storage unit wherein each shared decryption key set has an equal chance of being selected.

28. An encryption device for encrypting digital data using key information distributed from a key management device and for writing the encrypted digital data into a distribution medium, the encryption device comprising:

an encryption key storage unit disposed for storing an encryption key set distributed from the key management device, the encryption key set including N encryption keys, wherein N is an integer that is no less than 2;

scramble key generation unit for generating a scramble key;

a digital data encryption unit disposed for receiving the digital data from outside and encrypting the digital data using the scramble key to generate the encrypted digital data;

a key encryption unit disposed for encrypting, according to a predetermined method, the scramble key using each of the N encryption keys included in the encryption key set in the encryption key storage unit in order to generate N encrypted scramble keys; and a medium write unit for writing the encrypted digital data and the N encrypted scramble keys into the distribution medium.

29. The encryption device of claim 28, wherein the predetermined method is to combine the scramble key with a set of fixed information and encrypt a combination of the scramble key and the set of fixed information.

30. The encryption device of claim 28, wherein the predetermined method is to encrypt the scramble key and a set of fixed information to respectively generate the N encrypted scramble keys and N sets of encrypted fixed information, and wherein the medium write unit writes the encrypted digital data, the N encrypted scramble keys, and the N sets of encrypted fixed information into the distribution medium.

31. A decryption device for decrypting encrypted digital data written in a distribution medium using key information distributed from a key management device, the decryption device comprising:

an identification number storage unit disposed for storing an identification number distributed from the key management device, wherein the identification number is used to identify an encrypted scramble key, among N encrypted scramble keys written in the distribution medium, that corresponds to the decryption device;

a decryption key storage unit disposed for storing a decryption key set distributed from the key management device, the decryption key set including a predetermined number of decryption keys;

a ciphertext read unit disposed for reading the encrypted scramble key identified by the identification number from the distribution medium;

a digital data read unit disposed for reading the encrypted digital data from the distribution medium;

a decryption key read unit disposed for reading a decryption key from the decryption key set stored in the decryption key storage unit;

a decrypted text generation unit disposed for decrypting the read encrypted scramble key using the read decryption key to generate a decrypted text;

a decrypted text check unit disposed for checking whether the decrypted text is a correct decrypted text according to a predetermined criterion, wherein the correct decrypted text includes a scramble key;

a repeat control unit disposed for controlling the decryption key read unit, the decrypted text generation unit, and the decrypted text check unit to respectively repeat a decryption key reading, an encrypted scramble key decryption, and a decrypted text checking until the predetermined number of decryption keys are read from the decryption key set; and a digital data decryption unit disposed for decrypting the encrypted digital data using the obtained scramble key to obtain digital data.

32. The decryption device of claim 31, wherein the predetermined criterion is that the decrypted text includes a set of fixed information.

33. The decryption device of claim 31, wherein the distribution medium includes N sets of encrypted fixed information obtained by encrypting a set of fixed information using each of N encryption keys included in an encryption key set, wherein the decryption device further comprises:

an encrypted fixed information read unit disposed for reading a set of encrypted fixed information, among the N sets of encrypted fixed information, that is identified by the identification number; and an encrypted fixed information decryption unit disposed for decrypting the set of encrypted fixed information using each of the predetermined number of decryption keys, and wherein the predetermined criterion is that the set of fixed information is obtained as a result of decrypting the set of encrypted fixed information.

34. A key management device for identifying a type of an encryption device that encrypts digital data and writes the encrypted digital data into a distribution medium, the key management device comprising:

a ciphertext read unit disposed for reading an encrypted scramble key from the distribution medium;

a decryption key set read unit disposed for reading a decryption key set from N decryption key sets that each include a predetermined number of decryption keys;

a decryption selection unit disposed for decrypting the read encrypted scramble key using each of the predetermined number of decryption keys included in the read decryption key set in order to select a decryption key, among the predetermined number of decryption keys, that correctly decrypts the encrypted scramble key according to a predetermined criterion;

a repeat control unit disposed for controlling the ciphertext read unit, the decryption key set read unit, and the decryption selection unit to respectively repeat an encrypted scramble key reading, a decryption key set reading, and an encrypted scramble key decryption, until N encrypted scramble keys are read from the distribution medium, wherein N decryption keys are selected as a result of a control by the repeat control unit; and a key pattern detection unit disposed for detecting an encryption key set, among M encryption key sets, that matches the selected N decryption keys and identifying the type of the encryption device, among M types, specified by the detected encryption key set, wherein M and N are both integers that are no less than 2.

35. The key management device of claim 34, wherein the predetermined criterion is that a decrypted text obtained by decrypting the encrypted scramble key includes a set of fixed information.

36. The key management device of claim 34, wherein the distribution medium includes N sets of encrypted fixed information obtained by encrypting a set of fixed information using each of N encryption keys included in the encryption key set, wherein the key management device further comprises:

an encrypted fixed information read unit disposed for reading the N sets of encrypted fixed information; and an encrypted fixed information decryption unit disposed for decrypting the N sets of encrypted fixed information respectively using the N decryption key sets, and wherein the predetermined criterion is that the set of fixed information is obtained as a result of decrypting each of the N sets of encrypted fixed information.

37. A key management method used in a key management device that includes decryption a key storage unit disposed for storing N decryption key sets in which each include a predetermined number of decryption keys, and distributes key information to encryption devices of M types and decryption devices of N types, wherein M and N are both integers that are no less than 2, the key management method comprising:

generating an encryption key set that includes N encryption keys by selecting a decryption key, from each decryption key set stored in the decryption key storage unit, as an encryption key according to a predetermined method;

repeating the encryption key generation step until M encryption key sets are generated, distributing a different one of the M encryption key sets generated in the preceding step to all encryption devices of a same type out of the M types;

distributing a different one of the N decryption key sets stored in the decryption key storage unit to all decryption devices of a same type out of the N types; and distributing a different one of N identification numbers to all decryption devices of the same type out of the N types.

38. The key management method of claim 37, wherein the predetermined method is randomly selecting the decryption key from each decryption key set stored in the decryption key storage unit.

39. The key management method of claim 37, wherein the predetermined method is randomly and uniformly select selecting the decryption key from each decryption key set stored in the decryption key storage unit wherein each stored description key set has an equal chance of being selected.

40. An encryption method used in an encryption device that includes an encryption key storage unit disposed for storing an encryption key set distributed from a key management device, encrypting digital data using key information distributed from the key management device, and writing the encrypted digital data into a distribution medium, the encryption method comprising:

generating a scramble key;

receiving digital data from outside and encrypting the digital data using the scramble key to generate the encrypted digital data;

encrypting, according to a predetermined method, the scramble key using each of N encryption keys included in the encryption key set in the encryption key storage unit in order to generate N encrypted scramble keys, N being an integer that is no less than 2; and writing the encrypted digital data and the N encrypted scramble keys into the distribution medium.

41. The encryption method of claim 40, wherein the predetermined method includes combining the scramble key with a set of fixed information and encrypting a combination of the scramble key and the set of fixed information.

42. The encryption method of claim 40, wherein the predetermined method includes encrypting the scramble key and a set of fixed information to respectively generate the N encrypted scramble keys and N sets of encrypted fixed information, and writing the encrypted digital data, the N encrypted scramble keys, and the N sets of encrypted fixed information into the distribution medium.

43. A decryption method used in a decryption device that decrypts encrypted digital data written in a distribution medium using key information distributed from a key management device and includes: an identification number storage unit disposed for storing an identification number distributed from the key management device; and a decryption key storage unit disposed for storing a decryption key set distributed from the key management device, wherein the identification number is used to identify an encrypted scramble key, among N encrypted scramble keys written in the distribution medium, which corresponds to the decryption device, the decryption method comprising:

reading the encrypted scramble key identified by the identification number from the distribution medium;

reading the encrypted digital data from the distribution medium;

reading a decryption key from the decryption key set stored in the decryption key storage unit;

decrypting the read encrypted scramble key using the read decryption key to generate a decrypted text;

checking whether the decrypted text is a correct decrypted text according to a predetermined criterion, wherein the correct decrypted text includes a scramble key;

repeating the decryption key read step, the decrypted text generation step, and the decrypted text check step until a predetermined number of decryption keys are read from the decryption key set; and decrypting the encrypted digital data using the obtained scramble key to obtain digital data.

44. The decryption method of claim 43, wherein the predetermined criterion is that the decrypted text includes a set of fixed information.

45. The decryption method of claim 43, wherein the distribution medium includes N sets of encrypted fixed information obtained by encrypting a set of fixed information using each of N encryption keys included in an encryption key set, wherein the decryption method further comprises:

reading a set of encrypted fixed information, among the N sets of encrypted fixed information, that is identified by the identification number; and decrypting the set of encrypted fixed information using each of the predetermined number of decryption keys in the decryption key set, and wherein the predetermined criterion is that the set of fixed information is obtained as a result of decrypting the set of encrypted fixed information.

46. A key management method used in a key management device for identifying a type of an encryption device that encrypts digital data and writes the encrypted digital data into a distribution medium, the key management method comprising:

reading an encrypted scramble key from the distribution medium;

reading a decryption key set;

decrypting the encrypted scramble key using each of a predetermined number of decryption keys included in the read decryption key set in order to select a decryption key, among the predetermined number of decryption keys, that correctly decrypts the encrypted scramble key according to a predetermined criterion;

repeating the ciphertext read step, the decryption key set read step, and the decryption selection step until N encrypted scramble keys are read from the distribution medium, wherein N decryption keys are selected as a result of the preceding step; and a key pattern detection step of detecting an encryption key set, among M encryption key sets, that matches the selected N decryption keys and identifying the type of the encryption device specified by the detected encryption key set, wherein M and N are both integers that are no less than 2.

47. The key management method of claim 46, wherein the predetermined criterion is that a result of decrypting the encrypted scramble key includes a set of fixed information.

48. The key management method of claim 46, wherein the distribution medium includes N sets of encrypted fixed information obtained by encrypting a set of fixed information using each of N encryption keys included in the encryption key set, wherein the key management method further comprises:

reading the N sets of encrypted fixed information; and decrypting the N sets of encrypted fixed information respectively using N decryption key sets, and wherein the predetermined criterion is that the set of fixed information is obtained as a result of decrypting each of the N sets of encrypted fixed information.

\* \* \* \* \*

UNITED STATES PATENT AND TRADEMARK OFFICE
CERTIFICATE OF CORRECTION

PATENT NO. : 6,359,986 B1
DATED : March 19, 2002
INVENTOR(S) : Makoto Tatebayashi It is certified that error appears in the above-identified patent and that said Letters Patent is hereby corrected as shown below:

Column 29,
Line 38, delete "select".

Signed and Sealed this

Twenty-fifth Day of June, 2002

Attest:

Attesting Officer

JAMES E. ROGAN
Director of the United States Patent and Trademark Office